United States Patent
Ono et al.

(10) Patent No.: US 9,221,327 B2
(45) Date of Patent: Dec. 29, 2015

(54) HYBRID VEHICLE DRIVING APPARATUS

(75) Inventors: Tomohito Ono, Gotenba (JP); Yuji Iwase, Mishima (JP); Makoto Funahashi, Gotenba (JP); Atsushi Tabata, Okazaki (JP); Tooru Matsubara, Toyota (JP); Tatsuya Imamura, Okazaki (JP); Koichi Okuda, Toyota (JP); Hideaki Komada, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/375,964

(22) PCT Filed: Feb. 1, 2012

(86) PCT No.: PCT/JP2012/052300
§ 371 (c)(1),
(2), (4) Date: Nov. 10, 2014

(87) PCT Pub. No.: WO2013/114595
PCT Pub. Date: Aug. 8, 2013

(65) Prior Publication Data
US 2015/0072819 A1  Mar. 12, 2015

(51) Int. Cl.
| *B60K 6/445* | (2007.10) |
| *B60K 6/365* | (2007.10) |
| *B60K 6/547* | (2007.10) |
| *F16H 3/72* | (2006.01) |
(Continued)

(52) U.S. Cl.
CPC ............... *B60K 6/365* (2013.01); *B60K 6/387* (2013.01); *B60K 6/445* (2013.01); *B60K 6/547* (2013.01); *B60W 10/105* (2013.01); *B60W 10/115* (2013.01); *B60W 20/00* (2013.01); *B60W 20/20* (2013.01); *F16H 3/728* (2013.01); *B60K 2006/381* (2013.01); *F16H 2037/0873* (2013.01); *F16H 2200/2007* (2013.01); *F16H 2200/2038* (2013.01); *F16H 2200/2041* (2013.01); *F16H 2200/2082* (2013.01); *Y02T 10/6239* (2013.01); *Y10S 903/945* (2013.01)

(58) Field of Classification Search
None
See application file for complete search history.

(56) References Cited

U.S. PATENT DOCUMENTS

| 8,337,352 B2 * | 12/2012 | Morrow et al. ................... 475/5 |
| 2008/0195286 A1 | 8/2008 | Tabata et al. |

(Continued)

FOREIGN PATENT DOCUMENTS

| JP | 2005-321056 A | 11/2005 |
| JP | 2008-195303 A | 8/2008 |
| JP | 2009-190694 A | 8/2009 |

*Primary Examiner* — Justin Holmes
(74) *Attorney, Agent, or Firm* — Kenyon & Kenyon LLP

(57) ABSTRACT

Provided is a hybrid vehicle driving apparatus including: a power transmission mechanism which is connected to an engine and is able to output a rotation of the engine while changing the rotation speed; a differential mechanism which connects the power transmission mechanism and a drive wheel to each other; and a regulation device, wherein the differential mechanism includes a first rotation component which is connected to an output component of the power transmission mechanism, a second rotation component which is connected to a first rotating electric machine, and a third rotation component which is connected to a second rotating electric machine and the drive wheel, and wherein the regulation device switches between a state where a differential operation of the differential mechanism is regulated and a state where the differential operation of the differential mechanism is allowed.

5 Claims, 12 Drawing Sheets

(51) Int. Cl.
*B60K 6/387* (2007.10)
*B60W 10/105* (2012.01)
*B60W 20/00* (2006.01)
*B60W 10/115* (2012.01)
*F16H 37/08* (2006.01)
*B60K 6/38* (2007.10)

(56) References Cited

U.S. PATENT DOCUMENTS

2010/0029429 A1  2/2010  Ota
2011/0111909 A1*  5/2011  Kim et al. .......................... 475/5
2012/0028747 A1*  2/2012  Imamura et al. ................... 475/5
2012/0165149 A1*  6/2012  Morimoto et al. ................. 475/5

* cited by examiner

FIG.3

| | DRIVE STATE | | CL0 | CL1 | BK1 | MG1 | MG2 |
|---|---|---|---|---|---|---|---|
| EV | FORWARD TRAVEL | SINGLE MOTOR | | △ | △ | G | M |
| | | DOUBLE MOTORS | O | | | M | M |
| | | | | O | O | M | M |
| | BACKWARD TRAVEL | SINGLE MOTOR | | | | | M |
| | | DOUBLE MOTORS | O | | | M | M |
| | | | | O | O | M | M |
| HV | FORWARD TRAVEL | DIFFERENTIAL OPERATION | LOW | | O | | G | M |
| | | | HIGH | | | O | G | M |
| | | DIRECT CONNECTION | LOW | O | O | | M/G | M/G |
| | | | HIGH | O | | O | M/G | M/G |
| | BACKWARD TRAVEL | LOW | | O | | G | M |

O: ENGAGED    △: EITHER ONE IS ENGAGED WHEN ENGINE BRAKE IS ADDITIONALLY USED
G: MAINLY GENERATOR IN DRIVE STATE   M: MAINLY MOTOR IN DRIVE STATE

HYBRID VEHICLE DRIVING APPARATUS

CROSS-REFERENCE TO RELATED APPLICATIONS

This is a nation phase application based on the PCT International Patent Application No. PCT/JP2012/052300 filed Feb. 1, 2012, the entire contents of which are incorporated herein by reference.

FIELD

The present invention relates to a hybrid vehicle driving apparatus.

BACKGROUND

Hitherto, a hybrid vehicle with a transmission mechanism has been known. For example, Patent Literature 1 discloses a technique of a hybrid vehicle driving apparatus including a transmission mechanism which transmits a rotation of an internal combustion engine to a power distribution mechanism while changing the rotation speed, a first transmission shaft which transmits power from the internal combustion engine to the transmission mechanism, and a second transmission shaft which transmits power output from the transmission mechanism to the power distribution mechanism. The transmission mechanism of Patent Literature 1 includes a differential mechanism which is obtained by combining two pairs of planetary gear mechanisms, a first brake which is able to stop a rotation of a ring gear R1 of the differential mechanism, a second brake which is able to stop a rotation of a ring gear R2, and a clutch which enables and disables the transmission of power from the first transmission shaft to the ring gear R1.

CITATION LIST

Patent Literature

Patent Literature 1: Japanese Patent Application Laid-open No. 2009-190694

SUMMARY

Technical Problem

In a hybrid vehicle with a mechanism capable of changing a rotation speed of an engine, it is desirable to simplify a driving apparatus. For example, a driving apparatus which has a simple configuration and causes a vehicle to travel using two rotating electric motors as power sources is desirable.

An object of the present invention is to provide a hybrid vehicle driving apparatus which is capable of changing a rotation speed of an engine and causing a vehicle to travel using two rotating electric motors as power sources, and which has a simple configuration.

Solution to Problem

A hybrid vehicle driving apparatus according to the present invention includes a power transmission mechanism which is connected to an engine and is able to output a rotation of the engine while changing its rotation speed; a differential mechanism configured to connect the power transmission mechanism and a drive wheel to each other; and a regulation device, wherein the differential mechanism includes a first rotation component which is connected to an output component of the power transmission mechanism, a second rotation component which is connected to a first rotating electric machine, and a third rotation component which is connected to a second rotating electric machine and the drive wheel, and the regulation device switches between a state where a differential operation of the differential mechanism is regulated and a state where the differential operation of the differential mechanism is allowed.

In the hybrid vehicle driving apparatus, it is preferable to further include a switching device configured to switch the power transmission mechanism to a connection state where the engine and the differential mechanism are connected to each other and a neutral state where the engine and the differential mechanism are disconnected from each other, and it is preferable that a predetermined mode is provided in which the differential operation of the differential mechanism is regulated by the regulation device and the vehicle travels using the first rotating electric machine and the second rotating electric machine as power sources in the neutral state of the power transmission mechanism.

In the hybrid vehicle driving apparatus, it is preferable that at the time the engine is started up while the vehicle travels in the predetermined mode, the power transmission mechanism is switched to the connection state so as to rotate the engine.

In the hybrid vehicle driving apparatus, it is preferable that the speeds of the power transmission mechanism and the differential mechanism are simultaneously changed.

In the hybrid vehicle driving apparatus, it is preferable that at the time the speeds of the power transmission mechanism and the differential mechanism are simultaneously changed, one of speed change ratios of the power transmission mechanism and the differential mechanism is increased and the other speed change ratio thereof is decreased.

In the hybrid vehicle driving apparatus, it is preferable to further includes a second regulation device which is able to regulate a rotation of the first rotation component.

In the hybrid vehicle driving apparatus, it is preferable that the power transmission mechanism is a differential mechanism, and the switching device includes a clutch which is able to connect the rotation components of the power transmission mechanism to one another and a brake which regulates the rotation of the rotation component of the power transmission mechanism.

Advantageous Effects of Invention

A hybrid vehicle driving apparatus according to the present invention includes: a power transmission mechanism which is connected to an engine and is able to output a rotation of the engine while changing its rotation speed; a differential mechanism configured to connect the power transmission mechanism and a drive wheel to each other; and a regulation device. The differential mechanism includes a first rotation component which is connected to an output component of the power transmission mechanism, a second rotation component which is connected to a first rotating electric machine, and a third rotation component which is connected to a second rotating electric machine and the drive wheel. The regulation device switches between a state where a differential operation of the differential mechanism is regulated and a state where the differential operation of the differential mechanism is allowed. According to the hybrid vehicle driving apparatus of the invention, it is possible to obtain an effect in which the rotation speed of the engine may be changed in the travel state

BRIEF DESCRIPTION OF DRAWINGS

FIG. 3 is a diagram illustrating an operation engagement table of a hybrid vehicle driving apparatus according to the embodiment.

DESCRIPTION OF EMBODIMENTS

Hereinafter, a hybrid vehicle driving apparatus according to an embodiment of the present invention will be described in detail with reference to the drawings. Note that the invention is not limited to the embodiment. The components of the embodiment described below include a component which may be easily supposed by a person skilled in the art or a component which has substantially the same configuration.

[Embodiment]

Figure 1:
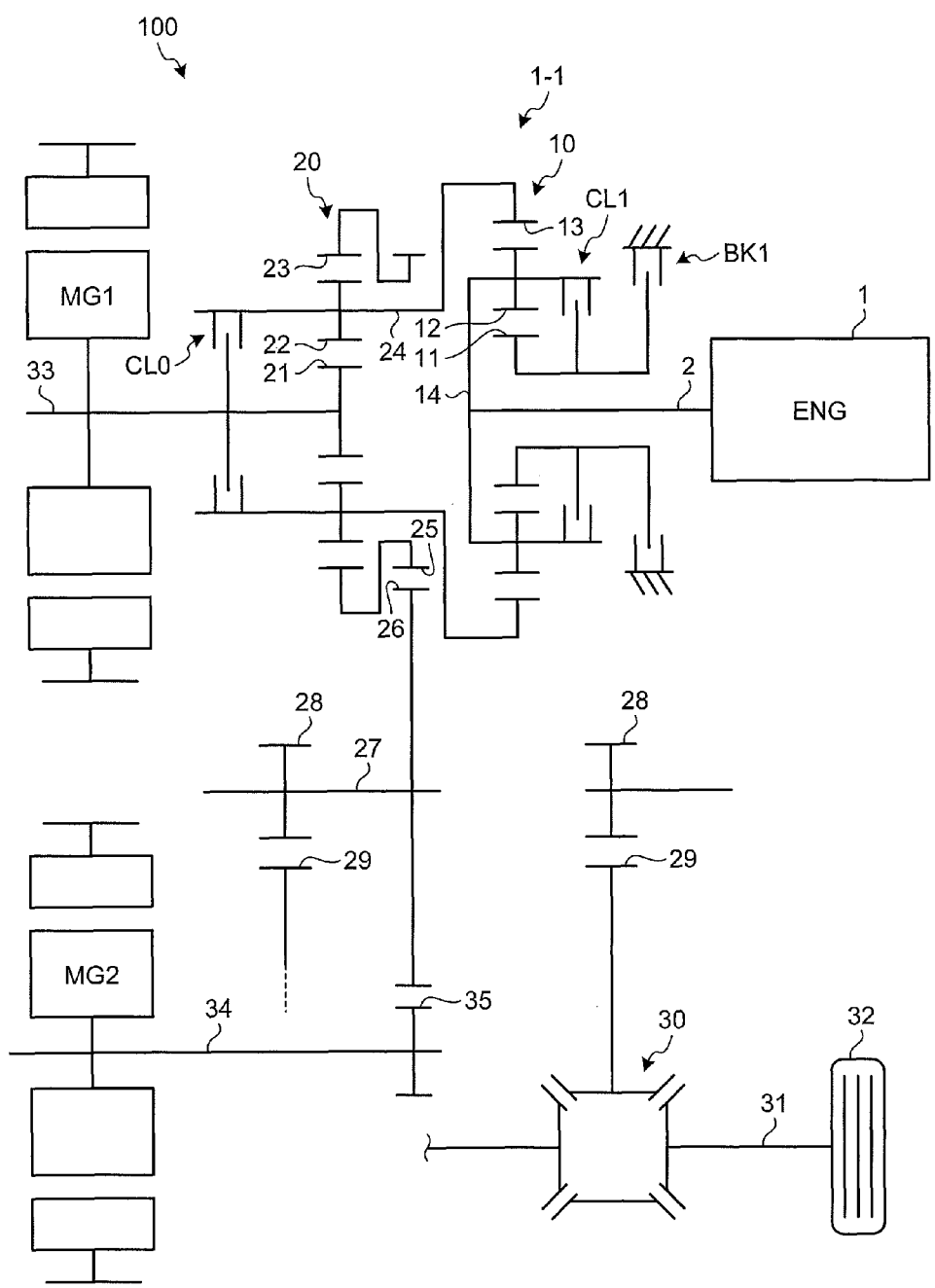
FIG. 1 is a skeleton diagram illustrating a vehicle according to an embodiment of the present invention.
Figure 2:
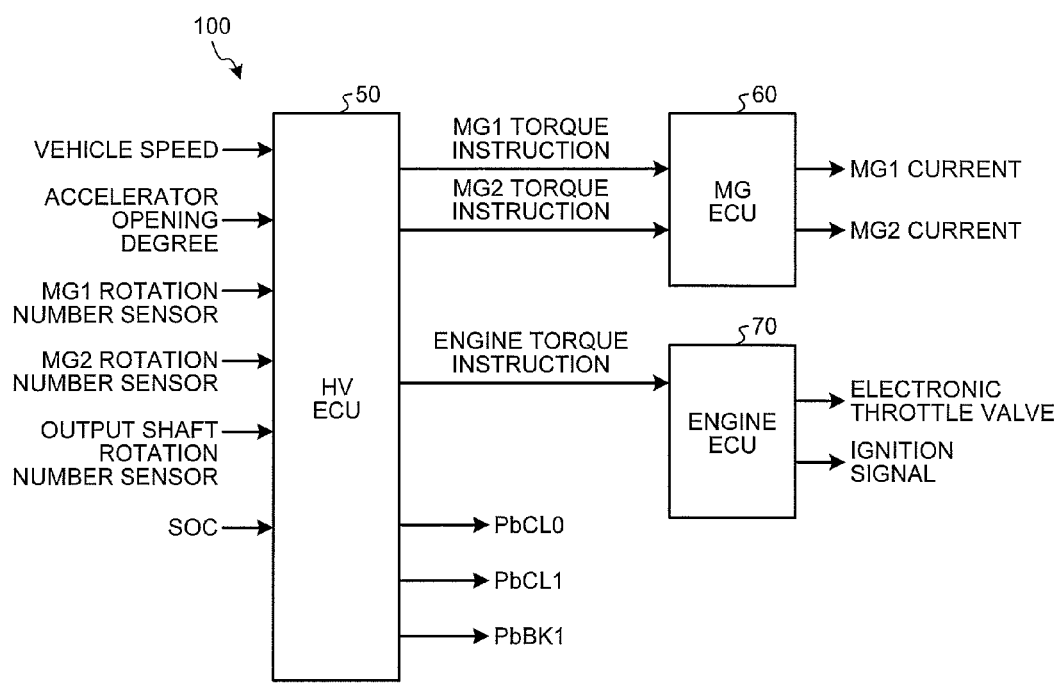
FIG. 2 is a diagram illustrating an input/output relation of the vehicle according to the embodiment.

An embodiment of the present invention will be described with reference to FIGS. 1 to 11. The embodiment relates to a hybrid vehicle driving apparatus. FIG. 1 is a skeleton diagram illustrating a vehicle according to the embodiment of the invention, and FIG. 2 is a diagram illustrating an input/output relation of the vehicle according to the embodiment.

A vehicle 100 according to the embodiment is a hybrid vehicle that includes an engine 1, a first rotating electric machine MG1, and a second rotating electric machine MG2 as power sources. The vehicle 100 may be a plug-in hybrid vehicle that may be charged by an external power supply. As illustrated in FIGS. 1 and 2, the vehicle 100 includes the engine 1, a first planetary gear mechanism 10, a second planetary gear mechanism 20, the first rotating electric machine MG1, the second rotating electric machine MG2, a differential unit clutch CL0, a transmission unit clutch CL1, a transmission unit brake BK1, a HV_ECU 50, a MG_ECU 60, and an engine_ECU 70.

Further, a hybrid vehicle driving apparatus 1-1 according to the embodiment includes the first planetary gear mechanism 10, the second planetary gear mechanism 20, and the differential unit clutch CL0. The hybrid vehicle driving apparatus 1-1 may further include a control device such as ECUs 50, 60, and 70, the transmission unit clutch CL1, the transmission unit brake BK1, or the like. The hybrid vehicle driving apparatus 1-1 is applicable to a FF (front-engine/front-wheel-drive) vehicle or a RR (rear-engine/rear-wheel-drive) vehicle. The hybrid vehicle driving apparatus 1-1 is mounted on the vehicle 100, for example, so that the axial direction is the vehicle width direction.

In the hybrid vehicle driving apparatus 1-1 according to the embodiment, a transmission unit includes the first planetary gear mechanism 10, the transmission unit clutch CL1, and the transmission unit brake BK1. Further, a differential unit includes the second planetary gear mechanism 20 and the differential unit clutch CL0.

The engine 1 converts fuel combustion energy into the rotation movement of an output shaft. The output shaft of the engine 1 is connected to an input shaft 2. The input shaft 2 is an input shaft of a power transmission device. The power transmission device includes the first rotating electric machine MG1, the second rotating electric machine MG2, the clutches CL0 and CL1, the transmission unit brake BK1, the differential device 30, and the like. The input shaft 2 is disposed on the same axis as the output shaft of the engine 1 and the extension line of the output shaft. The input shaft 2 is connected to a first carrier 14 of the first planetary gear mechanism 10.

The first planetary gear mechanism 10 of the embodiment corresponds to a power transmission mechanism which is connected to the engine 1 and is able to output the rotation of the engine 1 while changing the speed thereof. Here, the first planetary gear mechanism 10 which is a differential mechanism is illustrated as an example of the power transmission mechanism. The first planetary gear mechanism 10 is mounted on the vehicle 100 as a first differential mechanism. The first planetary gear mechanism 10 is an input-side differential mechanism which is disposed closer to the engine 1 as compared to the second planetary gear mechanism 20. The first planetary gear mechanism 10 is of a single pinion type, and includes a first sun gear 11, a first pinion gear 12, a first ring gear 13, and the first carrier 14. The hybrid vehicle driving apparatus 1-1 is mounted on the vehicle 100, for example, so that the axial direction is the vehicle width direction.

The first ring gear 13 is disposed so as to be coaxial with the first sun gear 11 and to be located at the outside of the first sun gear 11 in the radial direction. The first pinion gear 12 is disposed between the first sun gear 11 and the first ring gear 13, and engages with each of the first sun gear 11 and the first ring gear 13. The first pinion gear 12 is rotatably supported by the first carrier 14. The first carrier 14 is connected to the input shaft 2, and rotates along with the input shaft 2. Thus, the first pinion gear 12 can rotate (revolve) around the center axis of the input shaft 2 along with the input shaft 2, and can rotate (spin) about the center axis of the first pinion gear 12 while being supported by the first carrier 14.

The transmission unit clutch CL1 is a clutch device which can connect the first sun gear 11 and the first carrier 14 to each other. The transmission unit clutch CL1 may be, for example, a friction-engagement-type clutch, but the present invention is not limited thereto. For example, an existing clutch device such as a meshing-type clutch may be used as the transmission unit clutch CL1. The transmission unit clutch CL1 is controlled by, for example, a hydraulic pressure so as to be engaged or released. In the complete engagement state of the transmission unit clutch CL1, the first sun gear 11 and the first carrier 14 are connected to each other, and hence the first sun gear 11 and the first carrier 14 may be rotated together. On the other hand, in the release state of the transmission unit clutch CL1, the first sun gear 11 and the first carrier 14 are separated from each other, and hence the relative rotation between the first sun gear 11 and the first carrier 14 is allowed. Note that the transmission unit clutch CL1 may be controlled in a half engagement state.

The transmission unit brake BK1 is a brake device which can regulate the rotation of the first sun gear 11. The transmission unit brake BK1 includes an engagement component which is connected to the first sun gear 11 and an engagement component which is connected to a vehicle body side, for example, a casing of the power transmission device. The transmission unit brake BK1 may be a friction-engagement-type clutch device like the transmission unit clutch CL1, but the present invention is not limited thereto. For example, an existing clutch device, such as an engagement-type clutch, may be used as the transmission unit brake BK1. The transmission unit brake BK1 is controlled by, for example, a hydraulic pressure so as to be engaged or released. In the complete engagement state of the transmission unit brake BK1, the first sun gear 11 and the vehicle body side are connected to each other, and hence the rotation of the first sun gear 11 can be regulated. On the other hand, in the release state of the transmission unit brake BK1, the first sun gear 11 and the vehicle body side are separated from each other, and hence the rotation of the first sun gear 11 is allowed. Note that the transmission unit brake BK1 may be controlled in a half engagement state.

The second planetary gear mechanism 20 of the embodiment corresponds to a differential mechanism which connects the first planetary gear mechanism 10 and the drive wheel 32 to each other. The second planetary gear mechanism 20 is mounted as a second differential mechanism on the vehicle 100. The second planetary gear mechanism 20 is an output-side differential mechanism which is disposed closer to the drive wheel 32 as compared to the first planetary gear mechanism 10. The second planetary gear mechanism 20 is of a single pinion type, and includes a second sun gear 21, a second pinion gear 22, a second ring gear 23, and a second carrier 24. The second planetary gear mechanism 20 is disposed so as to be coaxial with the first planetary gear mechanism 10, and is disposed so as to face the engine 1 with the first planetary gear mechanism 10 interposed therebetween.

The second ring gear 23 is disposed so as to be coaxial with the second sun gear 21 and to be located at the outside of the second sun gear 21 in the radial direction. The second pinion gear 22 is disposed between the second sun gear 21 and the second ring gear 23, and engages with each of the second sun gear 21 and the second ring gear 23. The second pinion gear 22 is rotatably supported by the second carrier 24. The second carrier 24 is connected to the first ring gear 13, and rotates along with the first ring gear 13. Thus, the second pinion gear 22 can rotate (revolve) around the center axis line of the input shaft 2 along with the second carrier 24, and can rotate (spin) about the center axis line of the second pinion gear 22 while being supported by the second carrier 24. The first ring gear 13 is an output component of the first planetary gear mechanism 10, and can output the rotation input from the engine 1 to the first planetary gear mechanism 10 to the second carrier 24. The second carrier 24 corresponds to a first rotation component connected to the output component of the first planetary gear mechanism 10.

A rotation shaft 33 of the first rotating electric machine MG1 is connected to the second sun gear 21. The rotation shaft 33 of the first rotating electric machine MG1 is disposed so as to be coaxial with the input shaft 2 and rotates along with the second sun gear 21. The second sun gear 21 corresponds to a second rotation component connected to the first rotating electric machine MG1. A counter drive gear 25 is connected to the second ring gear 23. The counter drive gear 25 is an output gear which rotates along with the second ring gear 23. The second ring gear 23 corresponds to a third rotation component which is connected to the second rotating electric machine MG2 and the drive wheel 32. The second ring gear 23 is an output component which can output the rotation input from the first rotating electric machine MG1 or the first planetary gear mechanism 10 to the drive wheel 32.

The differential unit clutch CL0 of the embodiment corresponds to a regulation device which switches between a state where the differential operation of the second planetary gear mechanism 20 is regulated and a state where the differential operation of the second planetary gear mechanism 20 is allowed. The differential unit clutch CL0 is a clutch device which may connect the second sun gear 21 and the second carrier 24 to each other. The differential unit clutch CL0 may be, for example, a friction-engagement-type clutch, but the present invention is not limited thereto. For example, an existing clutch device such as a meshing-type clutch may be used as the differential unit clutch CL0. The differential unit clutch CL0 is controlled by, for example, a hydraulic pressure so as to be engaged or released.

In the complete engagement state of the differential unit clutch CL0, the second sun gear 21 and the second carrier 24 are connected to each other, and hence the second sun gear 21 and the second carrier 24 may be rotated together. In the complete engagement state of the differential unit clutch CL0, the differential operation of the second planetary gear mechanism 20 is regulated. On the other hand, in the release state of the differential unit clutch CL0, the second sun gear 21 and the second carrier 24 are disconnected from each other, and hence the relative rotation between the second sun gear 21 and the second carrier 24 is allowed. That is, in the release state of the differential unit clutch CL0, the differential operation of the second planetary gear mechanism 20 is allowed. Note that the differential unit clutch CL0 may be controlled in a half engagement state.

The counter drive gear 25 engages with a counter driven gear 26. The counter driven gear 26 is connected to a drive pinion gear 28 via a counter shaft 27. The counter driven gear 26 and the drive pinion gear 28 rotate together. Further, a reduction gear 35 engages with the counter driven gear 26. The reduction gear 35 is connected to a rotation shaft 34 of the second rotating electric machine MG2. That is, the rotation of the second rotating electric machine MG2 is transmitted to the counter driven gear 26 via the reduction gear 35. The reduction gear 35 has a diameter smaller than that of the counter driven gear 26, and transmits the rotation of the second rotating electric machine MG2 to the counter driven gear 26 reducing the rotation speed.

The drive pinion gear 28 engages with a differential ring gear 29 of the differential device 30. The differential device 30 is connected to the drive wheels 32 via right and left drive shafts 31. The second ring gear 23 is connected to the drive wheel 32 via the counter drive gear 25, the counter driven gear 26, the drive pinion gear 28, the differential device 30, and the drive shaft 31. Further, the second rotating electric machine MG2 is connected to the power transmission path between the second ring gear 23 and the drive wheel 32, and can transmit power to each of the second ring gear 23 and the drive wheel 32.

Each of the first rotating electric machine MG1 and the second rotating electric machine MG2 has a function as a motor (electric motor) and a function as a generator. The first rotating electric machine MG1 and the second rotating electric machine MG2 are connected to a battery via an inverter. The first rotating electric machine MG1 and the second rotating electric machine MG2 may convert the electricity supplied from the battery into mechanical power and may covert the mechanical power into electricity by the input power. The electricity generated by the rotating electric machines MG1 and MG2 may be stored in the battery. As the first rotating electric machine MG1 and the second rotating electric machine MG2, for example, AC synchronous motor generators may be used.

In the vehicle 100 of the embodiment, the transmission unit brake BK1, the transmission unit clutch CL1, the first planetary gear mechanism 10, the counter drive gear 25, the second planetary gear mechanism 20, and the first rotating electric machine MG1 are disposed so as to be coaxial with the engine 1 in order from the position near the engine 1. Further, the hybrid vehicle driving apparatus 1-1 of the embodiment is formed as a multi-axial type in which the input shaft 2 and the rotation shaft 34 of the second rotating electric machine MG2 are disposed on different axes.

As illustrated in FIG. 2, the vehicle 100 includes the HV_ECU 50, the MG_ECU 60, and the engine_ECU 70. Each of the ECUs 50, 60, and 70 is an electronic control unit with a computer. The HV_ECU 50 has a function of generally controlling the entire vehicle 100. The MG_ECU 60 and the engine_ECU 70 are electrically connected to the HV_ECU 50.

The MG_ECU 60 may control the first rotating electric machine MG1 and the second rotating electric machine MG2. For example, the MG_ECU 60 may control the output torque of the first rotating electric machine MG1 by adjusting the value of a current supplied to the first rotating electric machine MG1 and may control the output torque of the second rotating electric machine MG2 by adjusting the value of a current supplied to the second rotating electric machine MG2.

The engine_ECU 70 may control the engine 1. For example, the engine_ECU 70 may control an opening degree of an electronic throttle valve of the engine 1, may perform an engine ignition control by outputting an ignition signal, and may perform a fuel injection control on the engine 1. The engine_ECU 70 may control the output torque of the engine 1 by the electronic throttle valve opening degree control, the injection control, the ignition control, and the like.

A vehicle speed sensor, an accelerator opening degree sensor, a MG1 rotation number sensor, a MG2 rotation number sensor, an output shaft rotation number sensor, a battery sensor, and the like are connected to the HV_ECU 50. By such sensors, the HV_ECU 50 may acquire the vehicle speed, the accelerator opening degree, the rotation number of the first rotating electric machine MG1, the rotation number of the second rotating electric machine MG2, the rotation number of the output shaft of the power transmission device, the battery state SOC, and the like.

The HV_ECU 50 may calculate the demanded drive force, the demanded power, the demanded torque, and the like for the vehicle 100 based on the acquired information. The HV_ECU 50 determines the output torque of the first rotating electric machine MG1 (hereinafter, also referred to as the "MG1 torque"), the output torque of the second rotating electric machine MG2 (hereinafter, also referred to as the "MG2 torque") and the output torque of the engine 1 (hereinafter, also referred to as the "engine torque") based on the calculated demanded values. The HV_ECU 50 outputs a MG1 torque instruction value and a MG2 torque instruction value to the MG_ECU 60. Further, the HV_ECU 50 outputs an engine torque instruction value to the engine_ECU 70.

The HV_ECU 50 controls the differential unit clutch CL0, the transmission unit clutch CL1, and the transmission unit brake BK1 based on a travel mode and the like to be described later. The HV_ECU 50 outputs a hydraulic pressure supply instruction value (PbCL0) for the differential unit clutch CL0, a hydraulic pressure supply instruction value (PbCL1) for the transmission unit clutch CL1, and a hydraulic pressure supply instruction value (PbBK1) for the transmission unit brake BK1. A hydraulic pressure control device (not illustrated) controls the hydraulic pressures supplied to the differential unit clutch CL0, the transmission unit clutch CL1, and the transmission unit brake BK1 in response to the instruction values PbCL0, PbCL1, and PbBK1.

FIG. 3 is a diagram illustrating an operation engagement table of the hybrid vehicle driving apparatus 1-1 according to the embodiment. The vehicle 100 may selectively perform a hybrid (HV) travel mode or an EV travel mode. The HV travel mode is a travel mode in which the vehicle 100 travels using the engine 1 as a power source. In the HV travel mode, the second rotating electric machine MG2 may be used as a power source in addition to the engine 1.

The EV travel mode is a travel mode in which the vehicle travels using at least one of the first rotating electric machine MG1 and the second rotating electric machine MG2 as a power source. In the EV travel mode, the vehicle may travel as the engine 1 is stopped. As the EV travel mode, the hybrid vehicle driving apparatus 1-1 according to the embodiment includes a single-motor EV mode in which the vehicle 100 travels using the second rotating electric machine MG2 as a single power source and a double-motor EV mode in which the vehicle 100 travels using the first rotating electric machine MG1 and the second rotating electric machine MG2 as power sources.

Figure 4:
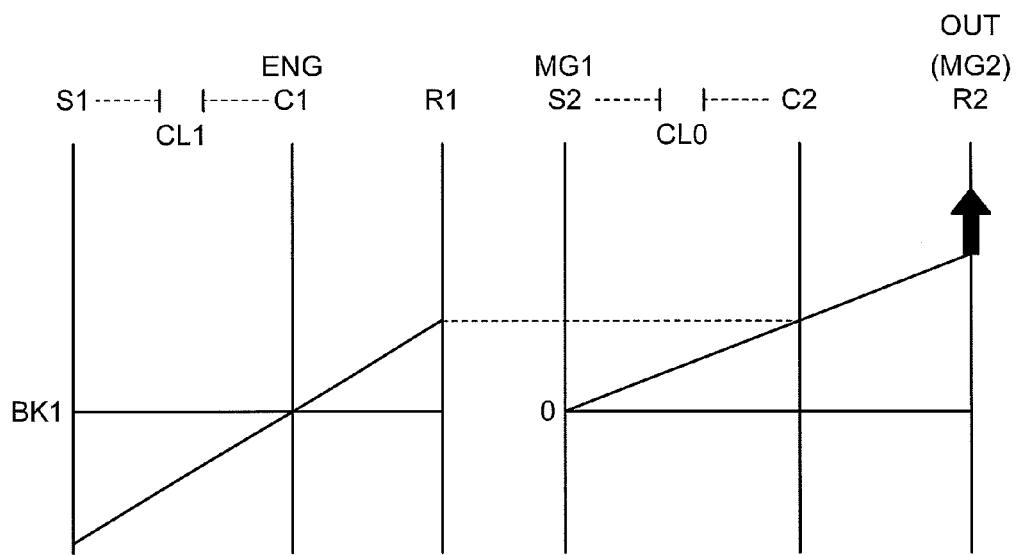
FIG. 4 is a collinear diagram according to a single-motor EV mode.

In the engagement table of FIG. 3, the circles in the section of the differential unit clutch CL0, the section of the transmission unit clutch CL1, and the section of the transmission unit brake BK1 indicate the engagement state, and the blank indicates the release state. Further, the triangles indicate the operation state regardless of the engagement/release state. The single-motor EV mode is performed by releasing the differential unit clutch CL0. For example, the single-motor EV mode is performed by releasing both the transmission unit clutch CL1 and the transmission unit brake BK1. FIG. 4 is a collinear diagram according to the single-motor EV mode. In the collinear diagram, the reference signs S1, C1, and R1 respectively indicate the first sun gear 11, the first carrier 14, and the first ring gear 13, and the reference signs S2, C2, and R2 respectively indicate the second sun gear 21, the second carrier 24, and the second ring gear 23.

In the single-motor EV mode, the differential unit clutch CL0, the transmission unit clutch CL1, and the transmission unit brake BK1 are released. When the transmission unit brake BK1 is released, the rotation of the first sun gear 11 is allowed. When the transmission unit clutch CL1 is released, the differential operation of the first planetary gear mechanism 10 may be performed. When the differential unit clutch CL0 is released, the differential operation of the second planetary gear mechanism 20 may be performed. The second rotating electric machine MG2 is controlled by the HV_ECU50 via the MG_ECU60 and outputs a positive torque so that a drive force is generated in the vehicle 100 in the forward travel direction. The second ring gear 23 rotates in the positive direction while being interlocked with the rotation of the drive wheel 32. Here, the positive rotation is set as the rotation direction of the second ring gear 23 when the vehicle 100 moves forward. The HV_ECU 50 reduces the dragging loss by operating the first rotating electric machine MG1 as a generator. Specifically, the HV_ECU 50 applies a slight torque to the first rotating electric machine MG1 and generates electricity so that the rotation number of the first rotating electric machine MG1 is set to zero. Accordingly, the dragging loss of the first rotating electric machine MG1 may be reduced.

The first ring gear 13 rotates in the positive direction in accordance with the rotation of the second carrier 24. Since the first planetary gear mechanism 10 is in a neutral state where the transmission unit clutch CL1 and the transmission unit brake BK1 are released, the rotation of the first carrier 14 stops without rotating the engine 1. Accordingly, a large regeneration amount may be obtained. The first sun gear 11 rotates in the negative direction in an idle rotation state. Note that the neutral state of the first planetary gear mechanism 10 is a state where no power is transmitted between the first ring gear 13 and the first carrier 14, that is, the engine 1 and the second planetary gear mechanism 20 are separated from each other as a disconnection state. The first planetary gear mechanism 10 is in a connection state where the engine 1 and the second planetary gear mechanism 20 are connected to each other when at least one of the transmission unit clutch CL1 and the transmission unit brake BK1 is in the engagement state.

In this way, each of the transmission unit clutch CL1 and the transmission unit brake BK1 has a function of a switching device that switches the first planetary gear mechanism 10 to the connection state and the neutral state.

In the case where the vehicle travels in the single-motor EV mode, the regeneration energy may not be obtained due to the full charge state of the battery. In this case, a case may be considered in which an engine brake is used together. When the transmission unit clutch CL1 or the transmission unit brake BK1 is engaged, the engine 1 is connected to the drive wheel 32 so that the engine brake may be applied to the drive wheel 32. As indicated by the triangles of FIG. 3, when the transmission unit clutch CL1 or the transmission unit brake BK1 is engaged in the single-motor EV mode, the engine 1 is rotated, and the engine brake may be operated by increasing the engine rotation number using the first rotating electric machine MG1.

In the double-motor EV mode, the HV_ECU 50 locks the rotation of the first planetary gear mechanism 10 or regulates the differential operation of the second planetary gear mechanism 20. For example, the HV_ECU 50 regulates the differential operation of the second planetary gear mechanism 20 by engaging the differential unit clutch CL0. At this time, the transmission unit clutch CL1 and the transmission unit brake BK1 are respectively released. In the embodiment, the double-motor EV mode in which the differential unit clutch CL0 is engaged and the transmission unit clutch CL1 and the transmission unit brake BK1 are released corresponds to a predetermined mode.

Figure 5:
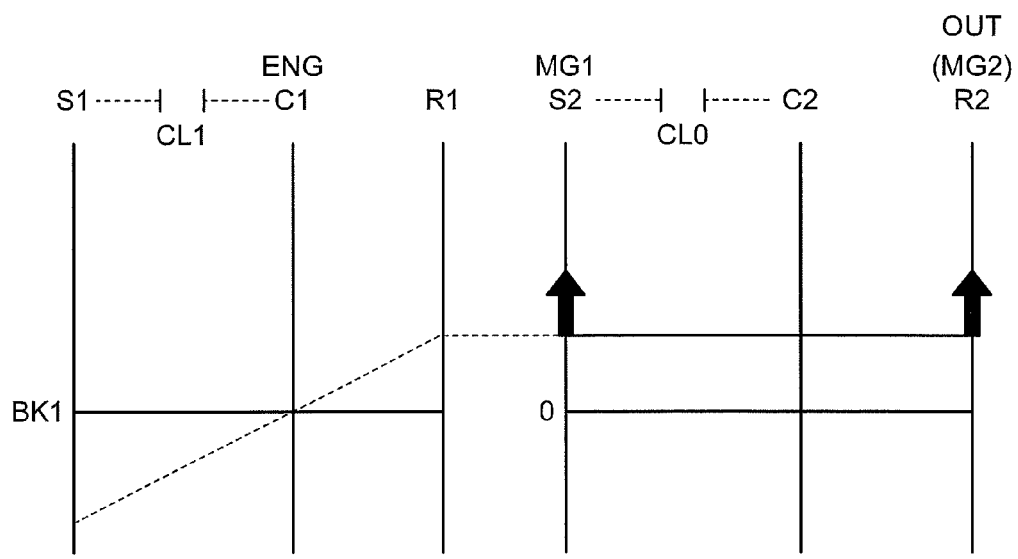
FIG. 5 is a collinear diagram according to a double-motor EV mode in which a differential operation of a second planetary gear mechanism is regulated.

FIG. 5 is a collinear diagram according to the double-motor EV mode in which the differential operation of the second planetary gear mechanism 20 is regulated. When the differential unit clutch CL0 is engaged, the relative rotation of the rotation components of the second planetary gear mechanism 20 is regulated, and the second sun gear 21, the second carrier 24, and the second ring gear 23 rotate at the same rotation number. The HV_ECU 50 makes each of the first rotating electric machine MG1 and the second rotating electric machine MG2 output travel driving torques.

The first rotating electric machine MG1 outputs a positive torque and rotates in the positive direction so as to output a positive torque from the second ring gear 23 when the vehicle travels forward. On the other hand, the first rotating electric machine MG1 outputs a negative torque and rotates in the negative direction so as to output a negative torque from the second ring gear 23 when the vehicle travels backward. In the double-motor EV mode in which the differential operation of the second planetary gear mechanism 20 is regulated, the first planetary gear mechanism 10 is in the neutral state. Accordingly, the engine rotation number can be set to zero. Since the neutral state is realized by releasing the transmission unit clutch CL1 and the transmission unit brake BK1, there is no need to provide a clutch dedicated to disconnecting the engine.

Figure 6:
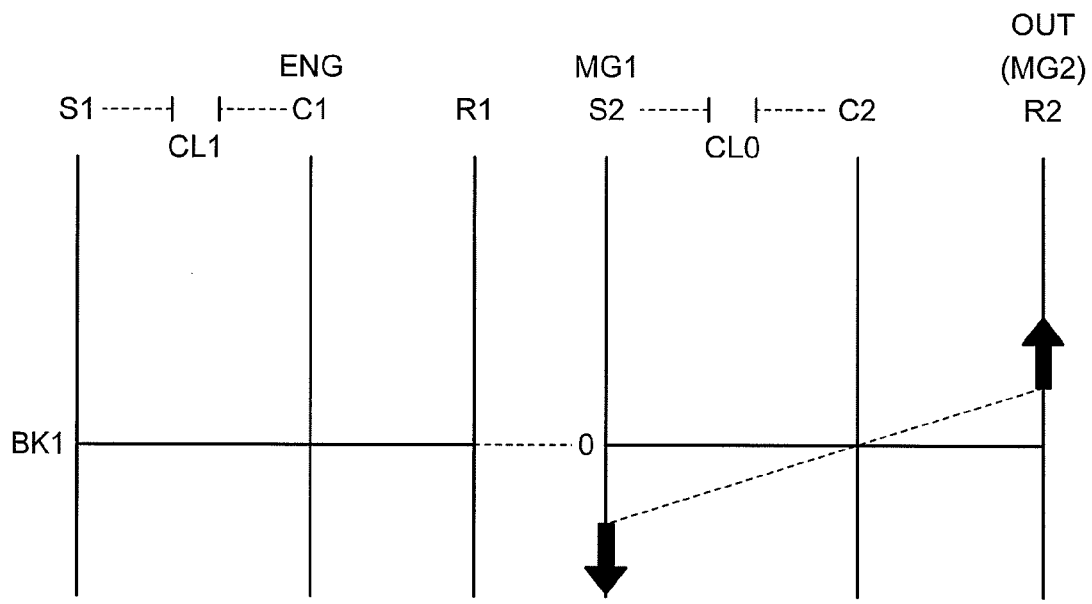
FIG. 6 is a collinear diagram according to a double-motor EV mode in which a rotation of a first planetary gear mechanism is locked.

In the case where the HV_ECU 50 performs the double-motor EV mode by locking the rotation of the first planetary gear mechanism 10, the differential unit clutch CL0 is released and each of the transmission unit clutch CL1 and the transmission unit brake BK1 is engaged. FIG. 6 is a collinear diagram according to the double-motor EV mode in which the rotation of the first planetary gear mechanism 10 is locked. When the transmission unit clutch CL1 is engaged, the differential operation of the first planetary gear mechanism 10 is regulated. When the transmission unit brake BK1 is engaged, the rotation of the first sun gear 11 is regulated. Thus, the rotation of the entire rotation components of the first planetary gear mechanism 10 is stopped.

Since the rotation of the first ring gear 13 as the output component is regulated, the rotation number of the second carrier 24 connected thereto is locked to zero. The HV_ECU 50 makes each of the first rotating electric machine MG1 and the second rotating electric machine MG2 output travel driving torques. Since the rotation of the second carrier 24 is regulated, a reaction force to the torque of the first rotating electric machine MG1 is obtained, and hence the torque of the first rotating electric machine MG1 may be output from the second ring gear 23. The first rotating electric machine MG1 may rotates in the negative direction outputting the negative torque so as to output a positive torque from the second ring gear 23 when the vehicle travels forward. On the other hand, the first rotating electric machine MG1 may rotates in the positive direction outputting the positive torque so as to output a negative torque from the second ring gear 23 when the vehicle travels backward.

Figure 7:
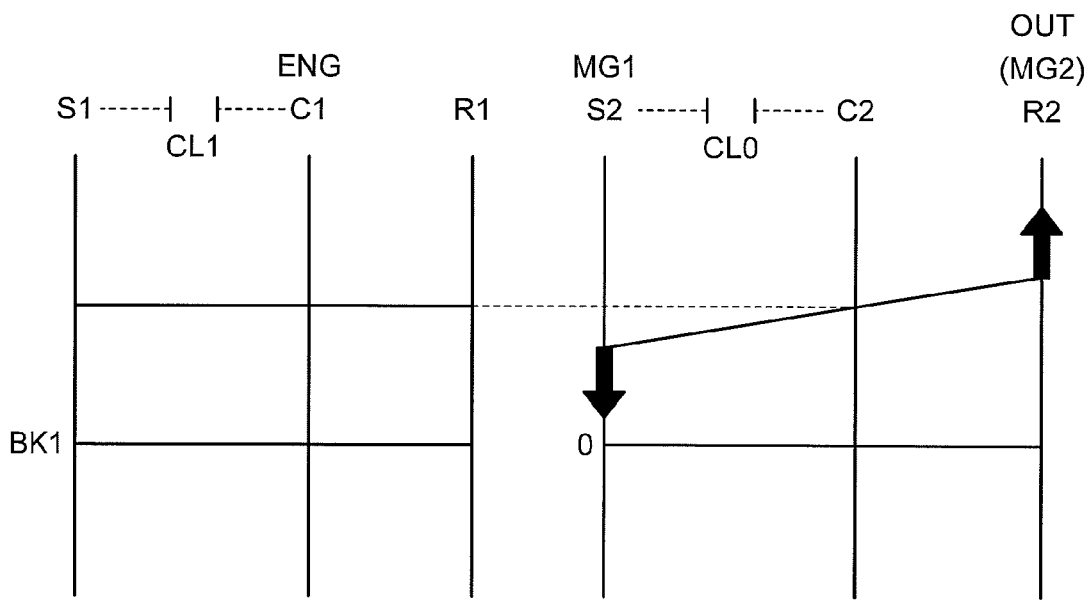
FIG. 7 is a collinear diagram according to a low-state HV travel mode.
Figure 8:
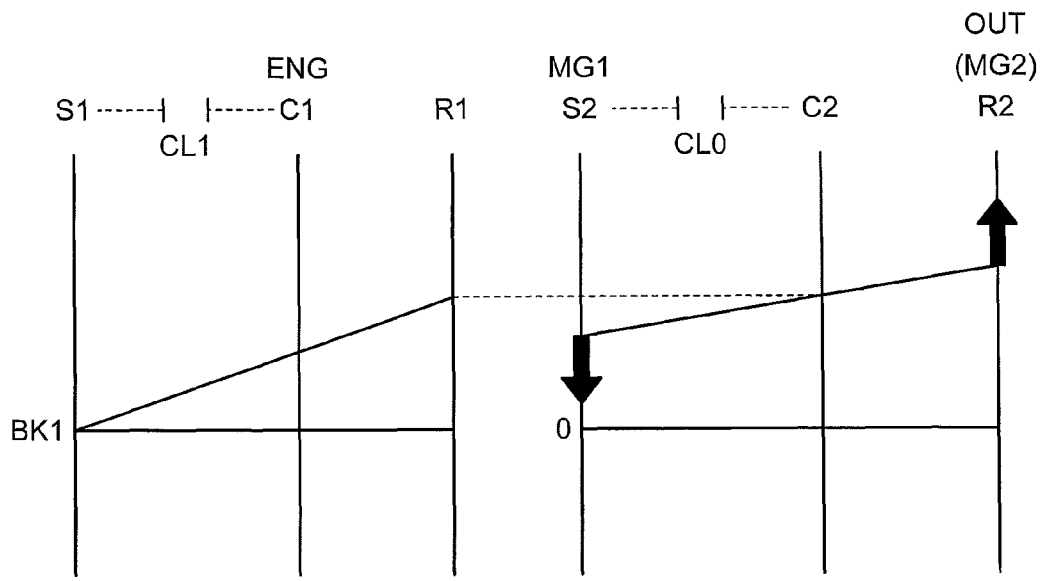
FIG. 8 is a collinear diagram according to a high-state HV travel mode.

In the HV travel mode, the second planetary gear mechanism 20 as the differential unit is basically in a differential operation state, and the first planetary gear mechanism 10 of the transmission unit is operated in a high-state HV travel mode or a low-state HV travel mode. FIG. 7 is a collinear diagram according to the low-state HV travel mode (hereinafter, also referred to as the "HV low mode"), and FIG. 8 is a collinear diagram according to the high-state HV travel mode (hereinafter, also referred to as the "HV high mode").

In the HV low mode, the HV_ECU 50 engages the transmission unit clutch CL1 and releases the transmission unit brake BK1. Since the transmission unit clutch CL1 is engaged, the differential operation of the first planetary gear mechanism 10 is regulated, and the rotation components 11, 13, and 14 rotate together. Thus, the rotation speed of the engine 1 does not increase or decrease, and the rotation thereof is transmitted from the first ring gear 13 to the second carrier 24 at an equal speed.

On the other hand, in the HV high mode, the HV_ECU 50 releases the transmission unit clutch CL1 and engages the transmission unit brake BK1. Since the transmission unit brake BK1 is engaged, the rotation of the first sun gear 11 is regulated. Thus, the first planetary gear mechanism 10 enters an over drive (OD) state where the rotation of the engine 1 input to the first carrier 14 is output from the first ring gear 13 while the rotation speed increases. In this way, the first planetary gear mechanism 10 may output the rotation of the engine 1 increasing the rotation speed. The speed change ratio in the over drive state may be set to, for example, 0.7.

Figure 9:
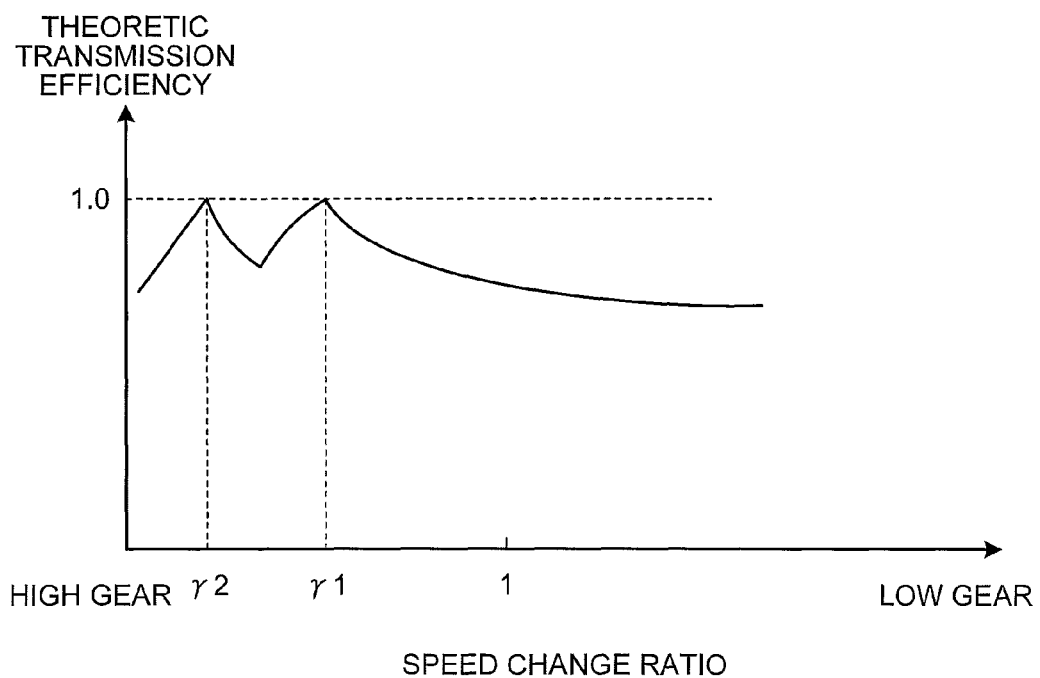
FIG. 9 is a diagram illustrating a theoretic transmission efficiency line according to the embodiment.

For example, the HV_ECU 50 selects the HV high mode at a high vehicle speed and selects the HV low mode at middle and low vehicle speeds. In the embodiment, since the rotation of the engine 1 is output while the rotation speed is changed in accordance with the switching between the HV high mode and the HV low mode, the number of mechanical points to be described later becomes two, and hence the fuel efficiency can be improved. FIG. 9 is a diagram illustrating a theoretic transmission efficiency line according to the embodiment.

In FIG. 9, the horizontal axis indicates the speed change ratio, and the vertical axis indicates the theoretic transmission efficiency. Here, the speed change ratio is the ratio (deceleration ratio) of the input-side rotation number to the output-side rotation number of the planetary gear mechanisms 10 and 20. For example, the speed change ratio indicates the ratio of the rotation number of the first carrier 14 to the rotation number of the second ring gear 23. In the horizontal axis, the left side indicates the high gear with a small speed change ratio, and the right side indicates the low gear with a large speed change ratio. Regarding the theoretic transmission efficiency, the maximum efficiency is 1.0 in the case where the entire power input to the planetary gear mechanisms 10 and 20 is transmitted to the counter drive gear 25 by the mechanical transmission without using an electric path.

The curve illustrated in FIG. 9 indicates the theoretic transmission efficiency line of the HV travel mode in the case where the HV high mode and the HV low mode are appropriately switched. For example, either the HV high mode or the HV low mode, whichever has a higher efficiency, is selected at the same speed change ratio. The right side relatively indicates the theoretic transmission efficiency line in the HV low mode, and the left side relatively indicates the theoretic transmission efficiency line in the HV high mode. The transmission efficiency of the HV low mode becomes the maximum efficiency at the speed change ratio $\gamma 1$. At the speed change ratio $\gamma 1$, the rotation number of the first rotating electric machine MG1 (the second sun gear 21) is zero. For this reason, at the speed change ratio $\gamma 1$, the electric path is zero due to the reaction force received by the first rotating electric machine MG1, and power can be transmitted from the engine 1 to the counter drive gear 25 only by the mechanical power transmission. The speed change ratio $\gamma 1$ is an over-drive-side speed change ratio, that is, a speed change ratio smaller than 1. The speed change ratio $\gamma 1$ is herein referred as the "first mechanical transmission speed change ratio $\gamma 1$".

The theoretic transmission efficiency of the HV high mode becomes the maximum efficiency at a speed change ratio $\gamma 2$. In the HV high mode, at the speed change ratio $\gamma 2$, the rotation number of the first rotating electric machine MG1 (the second sun gear 21) is zero, and power may be transmitted from the engine 1 to the counter drive gear 25 only by the mechanical power transmission. The speed change ratio $\gamma 2$ indicates a speed change ratio closer to a high gear side as compared to the first mechanical transmission speed change ratio $\gamma 1$. The speed change ratio $\gamma 2$ is herein referred to as the "second mechanical transmission speed change ratio $\gamma 2$".

The theoretic transmission efficiency of the HV travel mode decreases as the speed change ratio is closer to a low gear side as compared to the first mechanical transmission speed change ratio $\gamma 1$. Further, the theoretic transmission efficiency of the HV travel mode decreases as the speed change ratio is closer to the high gear side as compared to the second mechanical transmission speed change ratio $\gamma 2$. The theoretic transmission efficiency of the HV travel mode is curved to the low-efficiency side in the speed change ratio area between the first mechanical transmission speed change ratio $\gamma 1$ and the second mechanical transmission speed change ratio $\gamma 2$.

In this way, the hybrid vehicle driving apparatus 1-1 according to the embodiment includes two mechanical points closer to the high gear side as compared to the speed change ratio 1. Since the hybrid vehicle driving apparatus 1-1 includes the transmission unit with the first planetary gear mechanism 10, the transmission unit clutch CL1, and the transmission unit brake BK1, it is possible to generate a second mechanical point (the second mechanical transmission speed change ratio $\gamma 2$) closer to the high gear side as compared to the mechanical point (the first mechanical transmission speed change ratio $\gamma 1$) where the engine 1 is directly connected to the second carrier 24. Thus, it is possible to improve the transmission efficiency during the operation of the high gear. That is, it is possible to realize a hybrid system capable of improving the fuel efficiency as a consequence of the improvement in transmission efficiency in a high-speed travel state.

In the HV travel mode, the second planetary gear mechanism 20 may be locked so that the differential operation is not performed. In this case, the differential unit clutch CL0 is engaged. When the differential operation of the second planetary gear mechanism 20 is regulated, the second sun gear 21, the second carrier 24, and the second ring gear 23 rotate together. Accordingly, there is no need to receive the reaction force by the first rotating electric machine MG1 in order to transmit power from the second carrier 24 to the second ring gear 23, and the HV travel mode may be performed without generating the electric path. Even in the HV travel mode in which the differential operation of the second planetary gear mechanism 20 is not performed, the first planetary gear mechanism 10 can be set to a high state at a high vehicle speed, and the first planetary gear mechanism 10 may be set to a low state at middle and low vehicle speeds. In this way, since the vehicle travels switching the HV high mode and the HV low mode, the movement of the engine operation point is reduced, and the degradation of the fuel efficiency is suppressed.

Since the differential operation of the second planetary gear mechanism 20 is not performed, the first rotating electric machine MG1 may be used for an assisting purpose (as a motor) and a regenerating purpose (as a generator). Thus, in the HV travel mode in which the differential operation of the second planetary gear mechanism 20 is not performed, the HV_ECU 50 may use each of the rotating electric machines MG1 and MG2 for any one of the assisting purpose and the regenerating purpose as necessary.

When the vehicle travels backward in the HV travel mode, the HV_ECU 50 uses the first rotating electric machine MG1 as the generator and uses the second rotating electric machine MG2 as the motor, and rotates the second rotating electric machine MG2 in the negative direction. In the case where power can be supplied from the battery, the HV_ECU 50 may cause the vehicle 100 to travel backward by rotating only the second rotating electric machine MG2 in the negative direction or may cause the vehicle to travel backward by driving both the first rotating electric machine MG1 and the second rotating electric machine MG2.

In the case where the HV high mode and the HV low mode are switched, the HV_ECU 50 performs a cooperation speed change control in which the speeds of the first planetary gear mechanism 10 and the second planetary gear mechanism 20 are changed at the same time. In the cooperation speed change control, the HV_ECU 50 increases the speed change ratio of one of the first planetary gear mechanism 10 and the second planetary gear mechanism 20 and decreases the speed change ratio of the other.

In the case where the HV high mode is switched to the HV low mode, the HV_ECU 50 changes the speed change ratio of the second planetary gear mechanism 20 to the high gear side in synchronization with the switching of the mode. Accordingly, a discontinuous variation in entire speed change ratio of the vehicle 100 from the engine 1 to the drive wheel 32 is suppressed or reduced, and the speed change ratio variation degree can be reduced. Since the variation in speed change ratio from the engine 1 to the drive wheel 32 is suppressed, the engine rotation number adjustment amount in accordance with the speed change operation can be reduced or the engine rotation number does not need to be adjusted. The HV_ECU 50 changes the speeds of the first planetary gear mechanism 10 and the second planetary gear mechanism 20 in a cooperation state, for example, so that the speed change ratio of the entire vehicle 100 is continuously changed to the low side.

On the other hand, in the case where the HV low mode is switched to the HV high mode, the HV_ECU 50 changes the speed change ratio of the second planetary gear mechanism 20 to the low gear side in synchronization with the switching of the mode. Accordingly, a discontinuous variation in speed change ratio of the entire vehicle 100 is suppressed or reduced, and the speed change ratio variation degree can be reduced. The HV_ECU 50 changes the speeds of the first planetary gear mechanism 10 and the second planetary gear mechanism 20 in cooperation, for example, so that the speed change ratio of the entire vehicle 100 is continuously changed to the high side.

The adjustment of the speed change ratio of the second planetary gear mechanism 20 is performed by, for example, the control of the rotation number of the first rotating electric machine MG1. The HV_ECU 50 controls the first rotating electric machine MG1, for example, so that the speed change ratio between the input shaft 2 and the counter drive gear 25 is continuously changed. Accordingly, the entire part including the planetary gear mechanisms 10 and 20, the first rotating electric machine MG1, the transmission unit clutch CL1, and the transmission unit brake BK1, that is, the transmission device including the differential unit and the transmission unit is operated as an electric CVT (Continuously Variable Transmission).

(Engine Startup Control)

Next, an engine startup control of the hybrid vehicle driving apparatus 1-1 according to the embodiment will be described. The HV_ECU 50 starts up the stopped engine 1, for example, when the EV travel mode is switched to the HV travel mode. In the case where the engine 1 is started up from the single-motor EV mode, the HV_ECU 50 rotates the engine 1 by the first rotating electric machine MG1 so as to start up the engine 1. In the case where the engine 1 is started up from the double-motor EV mode, the HV_ECU 50 switches the first planetary gear mechanism 10 from the neutral state to the connection state, and hence can start up the engine 1 while the drive states of both machines are maintained.

Figure 10:
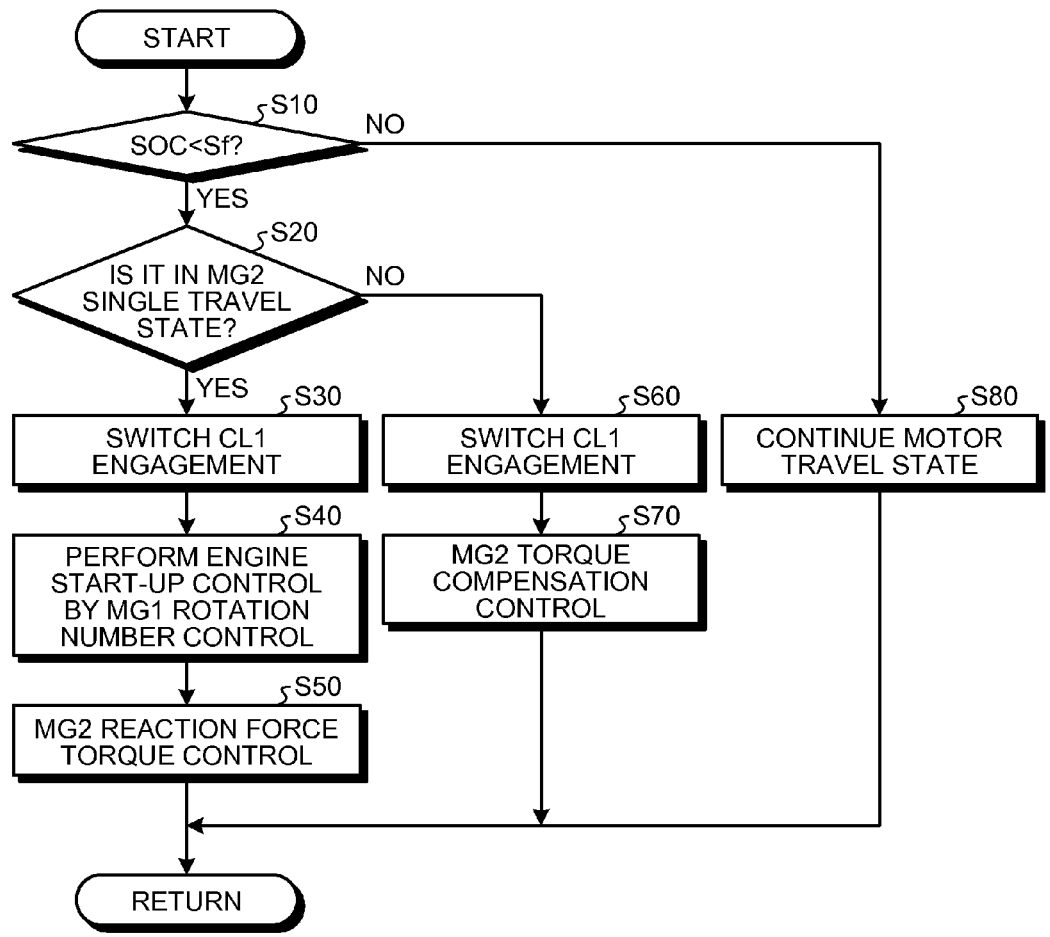
FIG. 10 is a flowchart of an engine startup control according to the embodiment.
Figure 11:
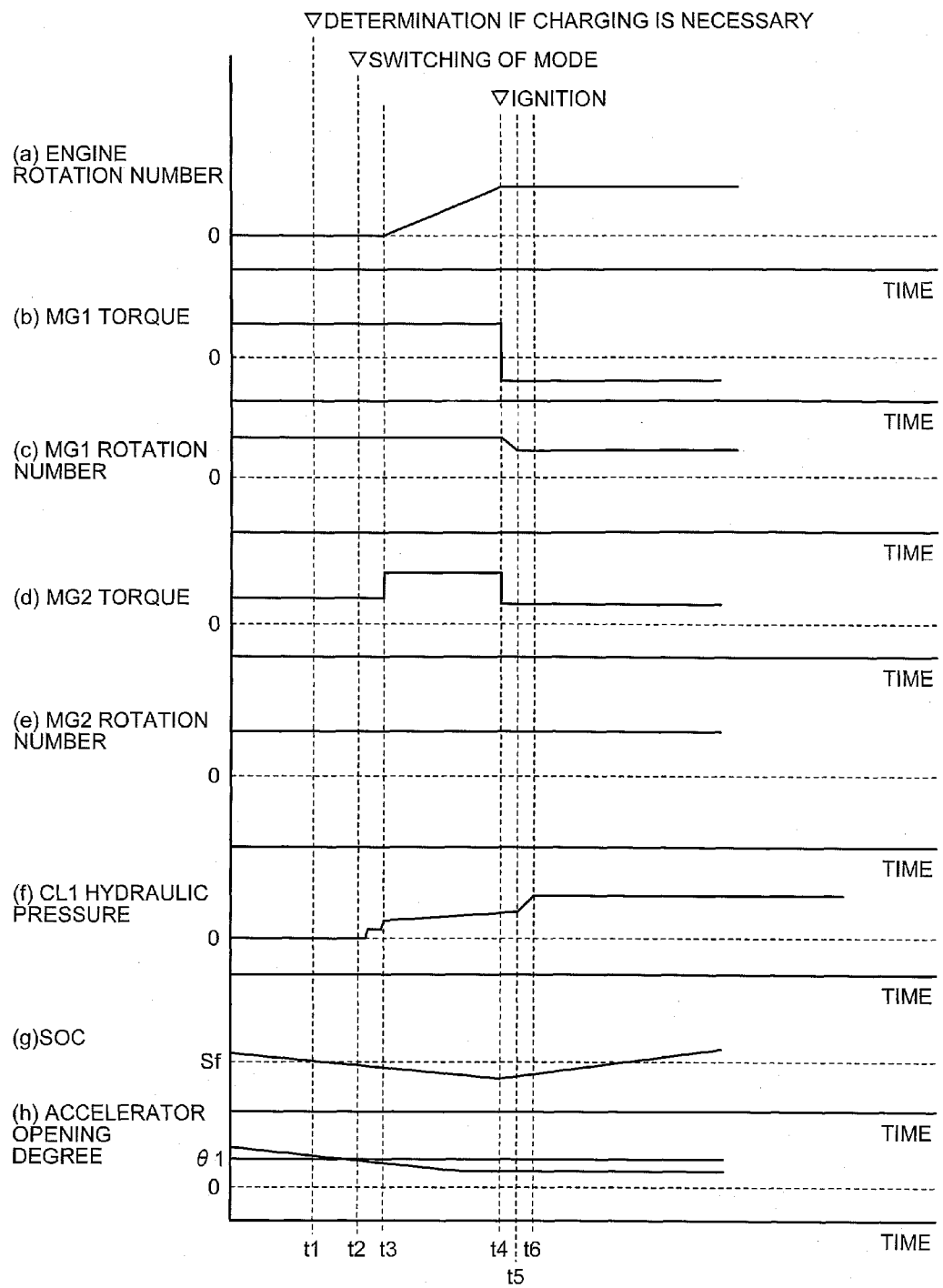
FIG. 11 is a time chart of the engine startup control of the embodiment.

Referring to FIG. 10, the engine startup control will be described. FIG. 10 is a flowchart according to the engine startup control of the embodiment, and FIG. 11 is a time chart according to the engine startup control of the embodiment. In FIG. 11, (a) indicates the engine rotation number, (b) indicates the MG1 torque, (c) indicates the rotation number of the first rotating electric machine MG1, (d) indicates the MG2 torque, (e) indicates the rotation number of the second rotating electric machine MG2, (f) indicates the hydraulic pressure of the transmission unit clutch CL1, (g) indicates a charging state SOC, and (h) indicates the accelerator opening degree. The control flowchart illustrated in FIG. 10 is performed, for example, while the vehicle travels in the EV travel mode.

In step S10, the HV_ECU 50 determines whether the charging state SOC is smaller than a threshold value Sf. The threshold value Sf is used to determine, for example, whether the battery needs to be charged after the startup of the engine 1. When it is determined that the charging state SOC is smaller than the threshold value Sf as a result of the determination in step S10 (step S10—Y), the routine proceeds to step S20. Otherwise (step S10—N), the routine proceeds to step S80. In FIG. 11, the charging state SOC becomes smaller than the threshold value Sf at the time t1, and hence a positive determination is made in step S10.

In step S20, the HV_ECU 50 determines whether the single-motor EV mode using the second rotating electric machine MG2 is performed. When the demanded drive force for the vehicle 100 is smaller than a predetermined value P1, the single-motor EV mode using the second rotating electric machine MG2 is selected. On the other hand, when the demanded drive force is equal to or larger than the predetermined value P1, the double-motor EV mode is selected. When it is determined that the vehicle travels in the single-motor EV mode as a result of the determination in step S20 (step S20—Y), the routine proceeds to step S30. Otherwise (step S20—N), the routine proceeds to step S60.

In step S30, the HV_ECU 50 switches the engagement of the transmission unit clutch CL1. In the single-motor EV mode, there are the case where the transmission unit clutch CL1 is engaged and the transmission unit brake BK1 is released as well as the case where the transmission unit clutch CL1 is released and the transmission unit brake BK1 is engaged, other than the case where both of the transmission unit clutch CL1 and the transmission unit brake BK1 are released. The HV_ECU 50 engages the transmission unit clutch CL1 and releases the transmission unit brake BK1. When the process in step S30 is performed, the routine proceeds to step S40.

In step S40, the HV_ECU 50 performs the engine startup control by a rotation number control of the first rotating electric machine MG1. When the transmission unit clutch CL1 is engaged, the engine 1 is connected to the first rotating electric machine MG1, the second rotating electric machine MG2, and the drive wheel 32, and is rotated accordingly. The HV_ECU 50 sets the rotation number of the second carrier 24 to zero by, for example, the rotation number control of the first rotating electric machine MG1, and engages the transmission unit clutch CL1. When the transmission unit clutch CL1 is engaged, the HV_ECU 50 increases the engine rotation number by the rotation number control of the first rotating electric machine MG1. When the engine rotation number increases to a predetermined rotation number, the HV_ECU 50 supplies fuel to the engine 1, and starts up the engine 1 by the ignition control. When the process in step S40 is performed, the routine proceeds to step S50.

Note that, when the transmission unit clutch CL1 is engaged, the HV_ECU 50 may smoothly engage the transmission unit clutch CL1 by gradually increasing the hydraulic pressure supplied to the transmission unit clutch CL1 while the second carrier 24 is rotated. After the transmission unit clutch CL1 is completely engaged, or upon increasing the clutch torque capacity of the transmission unit clutch CL1, the HV_ECU 50 increases the engine rotation number by the rotation number control of the first rotating electric machine MG1.

In step S50, a reaction torque control of the second rotating electric machine MG2 is performed by the HV_ECU 50. In the case where the engine rotation number is increased by the rotation number control of the first rotating electric machine MG1, a startup reaction torque is exerted on the second ring gear 23 due to the MG1 torque. The startup reaction torque is a torque in the negative direction, and is a torque that reduces the traveling drive force of the vehicle 100. The HV_ECU 50 increases the torque of the second rotating electric machine MG2 in the positive direction so as to suppress the leakage of the drive force due to the startup reaction torque. That is, in the reaction torque control, a cancel torque that cancels the startup reaction torque is output by the second rotating electric machine MG2. Accordingly, the degradation in drivability caused by a variation in torque during the startup of the engine is suppressed. When the process of step S50 is performed, the control flow ends.

In step S60, the engagement of the transmission unit clutch CL1 is switched by the HV_ECU 50. In the double-motor EV mode in which the differential operation of the second planetary gear mechanism 20 is not performed, the transmission unit clutch CL1 and the transmission unit brake BK1 are respectively released. The HV_ECU 50 engages the transmission unit clutch CL1 and releases the transmission unit brake BK1. Since the transmission unit clutch CL1 is engaged, the first planetary gear mechanism 10 enters the connection state where the first sun gear 11, the first carrier 14, and the first ring gear 13 rotate together, that is, the engine 1 and the second carrier 24 are connected to each other.

The HV_ECU 50 gradually increases, for example, the hydraulic pressure supplied to the transmission unit clutch CL1 so that the transmission unit clutch CL1 is (smoothly) engaged in a slip state. In FIG. 11, the switching of the mode is started at the time t2, and the hydraulic pressure supplied to the transmission unit clutch CL1 starts to increase. The transmission unit clutch CL1 is engaged at the time t3, and the engine rotation number starts to increase. The engine rotation number increases to a predetermined rotation number at the time t4, and the ignition of the engine 1 starts. Since the engine torque starts to be output, the MG1 torque may be switched from the positive torque for the traveling drive purpose to the negative torque for the reaction force receiving purpose. When the process in step S60 is performed, the routine proceeds to step S70.

In step S70, a MG2 torque compensation control is performed by the HV_ECU 50. When the transmission unit clutch CL1 is engaged in step S60, the torque corresponding to the amount of the inertia for increasing the engine rotation number, is consumed. The HV_ECU 50 compensates the degradation in torque by the amount of the inertia by the use of the MG2 torque, and suppresses degradation in output torque. Note that the degradation in torque by the amount of the inertia may be compensated by both torques of the first rotating electric machine MG1 and the second rotating electric machine MG2. When the process in step S70 is performed, the control flow ends.

In step S80, the motor travel state is continued by the HV_ECU 50. Since the engine startup is not necessary, the HV_ECU 50 keeps the travel of the vehicle in the EV travel mode. When the process in step S80 is performed, the control flow ends.

Note that, in the case where the engine is started up from the single-motor EV mode, the transmission unit brake BK1 may be engaged instead of engaging the transmission unit clutch CL1. Even in this configuration, the first planetary gear mechanism 10 becomes in the connection state and the engine rotation number can be increased.

In step S60, the transmission unit brake BK1 may be engaged instead of engaging the transmission unit clutch CL1. Since the transmission unit brake BK1 is engaged, the first sun gear 11 receives the reaction force, and the engine rotation number can be increased. The HV_ECU 50 may gradually increase the engine rotation number by gradually increasing the hydraulic pressure supplied to the transmission unit brake BK1. Whether to engage any one of the transmission unit clutch CL1 and the transmission unit brake BK1 at the time of the startup of the engine may be determined based on, for example, how much the engine rotation number increased due to the engagement. Any component which satisfies the increased engine rotation number necessary for the startup of the engine may be engaged.

In the case where the engine 1 is started up from the double-motor EV mode in which the rotation of the first planetary gear mechanism 10 is locked, the transmission unit brake BK1 may be released in step S60. In this case, the engine startup control may be performed by the rotation number control of the first rotating electric machine MG1 as in step S40, and the reaction torque control of the second rotating electric machine MG2 may be performed as in step S50.

As described above, the hybrid vehicle driving apparatus 1-1 according to the embodiment can switch between the HV high mode and the HV low mode by the transmission unit including the first planetary gear mechanism 10, the transmission unit clutch CL1, and the transmission unit brake BK1, and may improve the transmission efficiency of the vehicle 100. Further, the second planetary gear mechanism 20 as the differential unit is connected in series to the rear stage of the transmission unit. Since the first planetary gear mechanism 10 is in the over drive state, there is an advantage that the torque of the first rotating electric machine MG1 does not need to be largely increased.

Further, when the differential unit clutch CL0 is engaged, the differential operation of the second planetary gear mechanism 20 is regulated, and the vehicle can travel in the double-motor EV mode. In the double-motor EV mode in which the differential unit clutch CL0 is engaged, the engine 1 can be started up while the drive states of both machines are maintained. Thus, there is no need to perform the engine startup control by the rotation number control of the first rotating electric machine MG1, and the EV travel range can be widened. For example, in the double-motor EV mode in which the rotation of the first planetary gear mechanism 10 is locked, the MG1 torque is switched from the negative torque for the traveling drive purpose to the positive torque for the cranking purpose in the case where the engine 1 is started up by the first rotating electric machine MG1. In order to compensate the loss of the MG1 torque by the MG2 torque, there is a need to ensure an extra compensation torque in the MG2 torque. On the contrary, in the double-motor EV mode in which the differential unit clutch CL0 is engaged, since the loss of the MG1 torque does not occur, the EV travel range may be widened to the high output side.

In this way, since the engine 1 can be started up without switching the differential unit so that, for example, the MG1 torque is reversed, it is possible to suppress the degradation in the output torque just by increasing the MG2 torque and hence to reduce a switching shock.

In the layout of the hybrid vehicle driving apparatus 1-1 of the embodiment, the deceleration ratio of the second rotating electric machine MG2 may be set to be large. Further, a compact arrangement may be realized by the FF or RR layout.

Further, in the hybrid vehicle driving apparatus 1-1 of the embodiment, since the transmission unit including the first planetary gear mechanism 10 is disposed closer to the engine 1 as compared to the second planetary gear mechanism 20, a speed change ratio width is widened in the entire transmission. Thus, the speed change ratio from the differential unit to the vehicle wheel may be set to be large.

Further, when the transmission unit clutch CL1 and the transmission unit brake BK1 of the transmission unit are released to be the neutral state while the vehicle travels in the single-motor EV mode, the engine rotation number is substantially maintained in zero. Thus, there is no need to provide a clutch dedicated to disconnecting the engine.

Further, it is possible to switch the HV high mode and the HV low mode by changing the speed change ratio of the transmission unit in the HV travel mode. Since two mechanical points are generated by the changing of the speed change ratio, it is possible to suppress the circulation of power by selecting a speed change ratio suitable for the high-speed travel. Further, it is possible to suppress an abrupt change in speed change ratio by changing the speed of the second planetary gear mechanism 20 at the same time when the speed of the transmission unit is changed.

The differential unit clutch CL0 of the embodiment is used to connect the second sun gear 21 and the second carrier 24 to each other, but the present invention is not limited thereto. The differential unit clutch CL0 may be any clutch which can regulate the differential operation of the second planetary gear mechanism 20 by connecting the rotation components 21, 23, and 24 of the second planetary gear mechanism 20 to one another.

The transmission unit clutch CL1 of the embodiment is used to connect the first sun gear 11 and the first carrier 14 to each other, but the present invention is not limited thereto. The transmission unit clutch CL1 may be any clutch which can regulate the differential operation of the first planetary gear mechanism 10 by connecting the rotation components 11, 13, and 14 of the first planetary gear mechanism 10 to one another. Further, the transmission unit brake BK1 is not limited to the application of regulating the rotation of the first sun gear 11. The transmission unit brake BK1 may regulate the rotation of the other rotation component of the first planetary gear mechanism 10.

In the embodiment, the power transmission mechanism and the differential mechanism (the output-side differential mechanism) are respectively the planetary gear mechanisms 10 and 20, but the present invention is not limited thereto. The power transmission mechanism may be another existing differential mechanism or a gear mechanism capable of switching plural gear ratios. Further, another existing differential mechanism may be used as the output-side differential mechanism.

The power transmission mechanism may be of, for example, a twin clutch type. For example, the power transmission mechanism may include a first transmission unit which transmits the rotation of the engine 1 to the second planetary gear mechanism 20 via a first clutch at a first speed change ratio and a second transmission unit which transmits the rotation of the engine 1 to the second planetary gear mechanism 20 via a second clutch at a second speed change ratio. The first speed change ratio and the second speed change ratio are different from each other. The power transmission mechanism enters the connection state where power can be transmitted from the engine 1 to the second planetary gear mechanism 20 by the engagement with any one of the first clutch and the second clutch. Further, the rotation of the output component of the power transmission mechanism is regulated by engaging both the first clutch and the second clutch. Further, the power transmission mechanism enters the neutral state where power cannot be transmitted between the engine 1 and the second planetary gear mechanism 20 by releasing both the first clutch and the second clutch.

As such a configuration, for example, there is known a configuration with one input gear connected to the input component of the second planetary gear mechanism 20 and a first gear and a second gear respectively engaging with the input gear. The first gear is connected to the engine 1 via the first clutch, and the second gear is connected to the engine 1 via the second clutch. Further, the first gear and the second gear have different number of teeth. The first transmission unit includes the first gear, the first clutch, and the input gear. The second transmission unit includes the second gear, the second clutch, and the input gear. When the first clutch is engaged, the rotation of the engine 1 is transmitted, by the first transmission unit, to the second planetary gear mechanism 20 at the speed change ratio in response to the gear ratio between the first gear and the input gear. When the second clutch is engaged, the rotation of the engine 1 is transmitted, by the second transmission unit, to the second planetary gear mechanism 20 at the speed change ratio in response to the gear ratio between the second gear and the input gear. When both the first clutch and the second clutch are engaged, the rotation of the input gear is regulated due to the difference in gear ratios of the first transmission unit and the second transmission unit. Note that the first transmission unit and the second transmission unit may further include a transmission mechanism.

In the embodiment, the engine connected to the first planetary gear mechanism 10 is the engine 1. However, instead of this configuration, another existing engine may be connected to the first planetary gear mechanism 10.

First Modified Example of Embodiment

Figure 12:
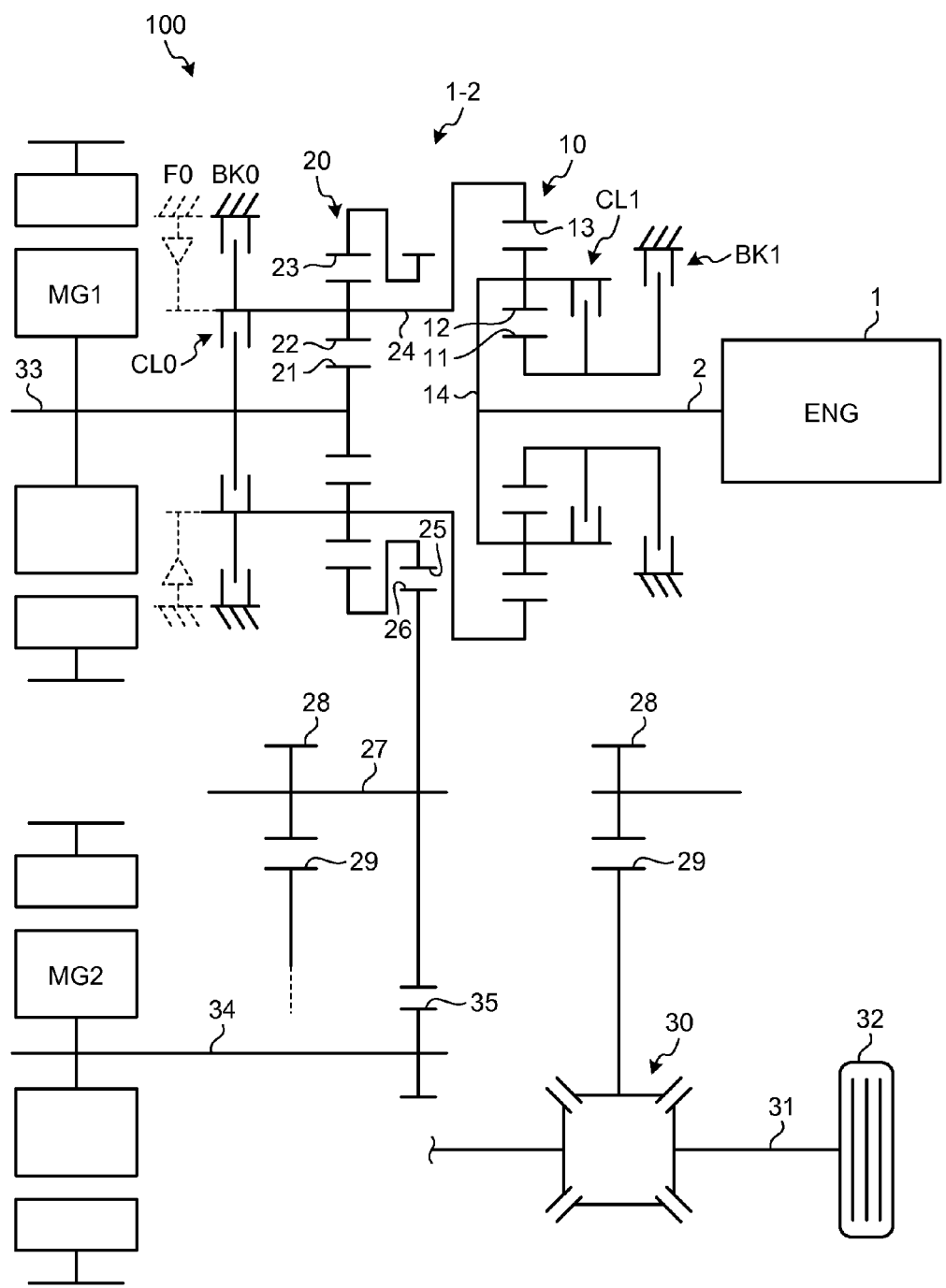
FIG. 12 is a skeleton diagram illustrating a vehicle according to a first modified example of the embodiment.

A first modified example of the embodiment will be described. FIG. 12 is a skeleton diagram illustrating the vehicle 100 according to the first modified example. A hybrid vehicle driving apparatus 1-2 according to the modified example is different from the hybrid vehicle driving apparatus 1-1 of the above-described embodiment in that a differential unit brake BK0 is provided. The differential unit brake BK0 can regulate the rotation of the second carrier 24. The differential unit brake BK0 is, for example, a friction-engagement-type brake device. The differential unit brake BK0 includes an engagement component which is connected to the vehicle body side and an engagement component which is connected to the second carrier 24. In the complete engagement state of the differential unit brake BK0, the vehicle body side and the second carrier 24 are connected to each other, so that the rotation of the second carrier 24 is regulated.

The HV_ECU 50 can realize the double-motor EV mode by engaging the differential unit brake BK0 instead of engaging the differential unit clutch CL0. When the engine 1 is started up from the double-motor EV mode in which the differential unit brake BK0 is engaged, the differential unit brake BK0 is released, the transmission unit clutch CL1 or the transmission unit brake BK1 is engaged, and hence the engine startup control may be performed by the rotation number control of the first rotating electric machine MG1.

Further, regeneration may be performed by the first rotating electric machine MG1 by engaging the differential unit brake BK0 in the HV travel mode. When the second carrier 24 is fixed by the engagement of the differential unit brake BK0, the HV_ECU 50 may use each of the rotating electric machines MG1 and MG2 for any one of the assisting purpose and the regenerating purpose as necessary.

A one-way clutch F0 may be provided instead of the differential unit brake BK0. The one-way clutch F0 can regulate the rotation of the second carrier 24. The one-way clutch F0 allows the positive rotation of the second carrier 24 and regulates the negative rotation thereof. The one-way clutch F0 serves as a reaction force receiver to the output torque of the first rotating electric machine MG1, and can output the MG1 torque to the second ring gear 23. When the first rotating electric machine MG1 rotates in the negative direction while outputting a negative torque, a positive torque for the forward travel driving purpose can be output from the second ring gear 23.

In the case where the one-way clutch F0 is provided, there is no need to supply a hydraulic pressure when the vehicle starts in the double-motor EV mode. For example, in the case where the double-motor EV mode is performed by engaging the differential unit clutch CL0 or the differential unit brake BK0, there is a need to supply a hydraulic pressure by an electric pump or the like when the vehicle starts to travel. On the contrary, there is an advantage that the one-way clutch F0 may receive the reaction force of the first rotating electric machine MG1 by being automatically engaged without requiring a hydraulic pressure when the vehicle starts to travel.

In the case where the double-motor EV mode is performed by the differential unit brake BK0 or the one-way clutch F0, the differential operation of the second planetary gear mechanism 20 can be performed, and the rotation of the first rotating electric machine MG1 can be output from the second planetary gear mechanism 20 in a deceleration state.

When the vehicle travels backward, it is possible to drive both the first rotating electric machine MG1 and the second rotating electric machine MG2 by fixing the second carrier 24 using the differential unit brake BK0 or the one-way clutch F0.

The differential unit brake BK0 and the one-way clutch F0 according to the modified example correspond to a second regulation device capable of regulating the rotation of the first rotation component of the second planetary gear mechanism 20. A switching means for selecting the double-motor EV mode is not limited to the differential unit brake BK0 or the one-way clutch F0. As the switching means, another mechanism capable of fixing the second carrier 24 (the first rotation component) may be used.

Second Modified Example of Embodiment

Figure 13:
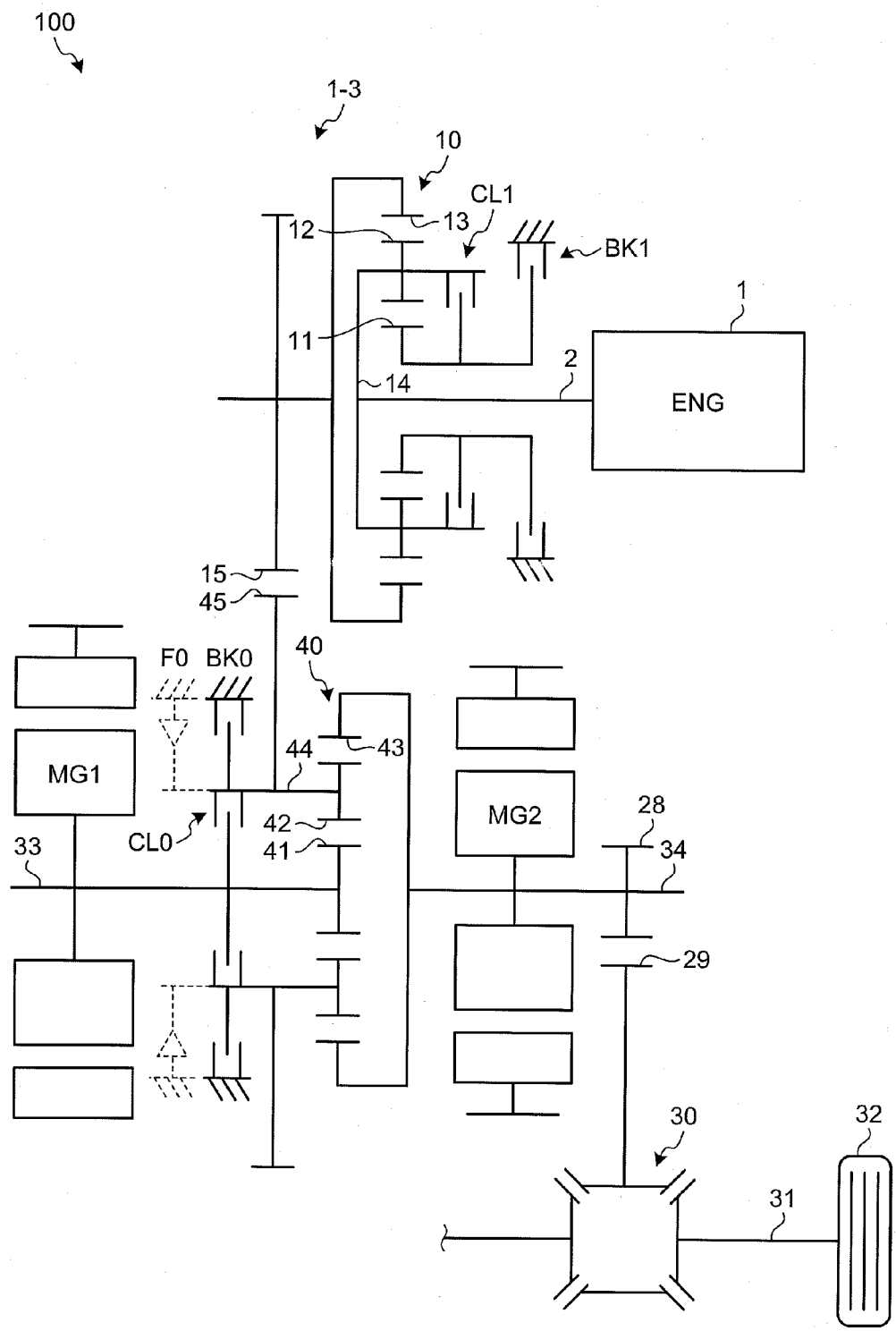
FIG. 13 is a skeleton diagram illustrating a vehicle according to a second modified example of the embodiment.

A second modified example of the embodiment will be described. FIG. 13 is a skeleton diagram illustrating the vehicle 100 according to the second modified example. A hybrid vehicle driving apparatus 1-3 according to the modified example is different from the hybrid vehicle driving apparatuses 1-1 and 1-2 of the above-described embodiment and the first modified example in that the differential unit is disposed on a second shaft, that is, the differential unit is disposed so as to be coaxial with the second rotating electric machine MG2. The configuration of the transmission unit may be set to be the same as those of the transmission units of the above-described embodiment and the first modified example. The hybrid vehicle driving apparatus 1-3 can be applied to the FF or RR layout.

As illustrated in FIG. 13, the first rotating electric machine MG1 and a second planetary gear mechanism 40 are disposed so as to be coaxial with the second rotating electric machine MG2. The drive pinion gear 28, the second rotating electric machine MG2, the second planetary gear mechanism 40, a counter driven gear 45, the differential unit clutch CL0, the differential unit brake BK0, and the first rotating electric machine MG1 are disposed so as to be coaxial with the second rotating electric machine MG2 in order from the position near the engine 1.

The second planetary gear mechanism 40 is of a single pinion type as in the second planetary gear mechanism 20 of the above-described embodiment, and includes a second sun gear 41, a second pinion gear 42, a second ring gear 43, and a second carrier 44. The counter driven gear 45 is connected to the second carrier 44. The counter driven gear 45 engages with a counter drive gear 15 connected to the first ring gear 13. That is, in the hybrid vehicle driving apparatus 1-3 according to the second modified example, the first ring gear 13 is the output component of the first planetary gear mechanism 10, and the second carrier 44 is the first rotation component of the second planetary gear mechanism 40, as in the hybrid vehicle driving apparatus 1-1 of the above-described embodiment.

The differential unit clutch CL0 can connect the second sun gear 41 and the second carrier 44 to each other as in the above-described embodiment. The differential unit brake BK0 can regulate the rotation of the second carrier 44, as in the first modified example of the above-described embodiment. The hybrid vehicle driving apparatus 1-3 may not include the differential unit brake BK0. Further, the one-way clutch F0 which regulates the negative rotation of the second carrier 44 may be provided instead of the differential unit brake BK0.

The first rotating electric machine MG1 is connected to the second sun gear 41. The rotation shaft 34 of the second rotating electric machine MG2 is connected to the second ring gear 43. That is, in the second planetary gear mechanism 40, the second sun gear 41 corresponds to the second rotation component, and the second ring gear 43 corresponds to the third rotation component. The drive pinion gear 28 is disposed in the rotation shaft 34 of the second rotating electric machine MG2. The hybrid vehicle driving apparatus 1-3 can be controlled based on the operation engagement table of the above-described embodiment. Further, in the case where the differential unit brake BK0 or the one-way clutch F0 is provided, the same control as the first modified example of the above-described embodiment can be performed.

The hybrid vehicle driving apparatus 1-3 according to the second modified example has an advantage that the first shaft being coaxial with the engine 1 can be shortened in the FF layout. Further, the differential unit is intensively disposed on the second shaft. Note that the drive pinion gear 28 and the differential ring gear 29 may be disposed between the second planetary gear mechanism 40 and the second rotating electric machine MG2.

Third Modified Example of Embodiment

Figure 14:
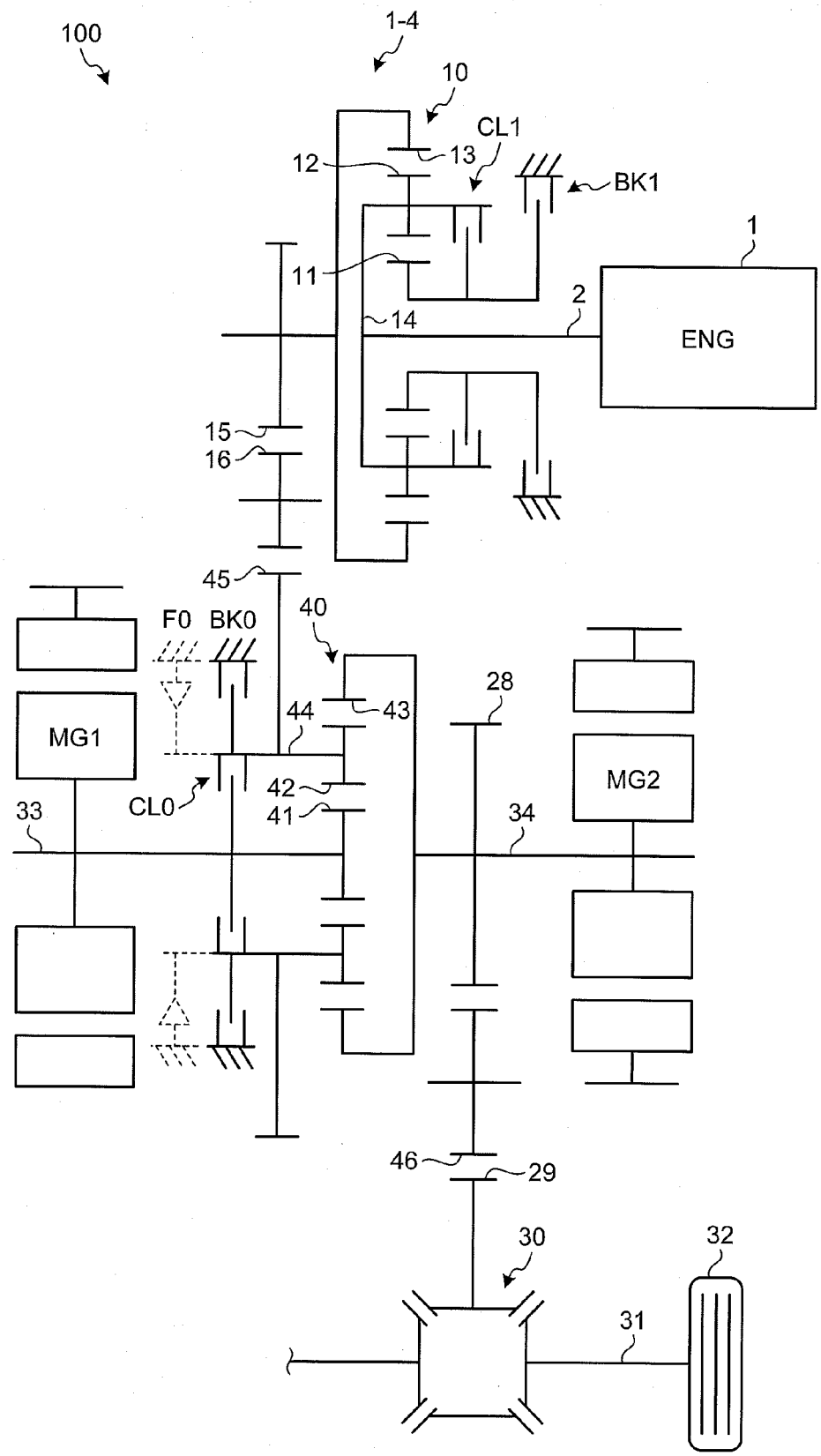
FIG. 14 is a skeleton diagram illustrating a vehicle according to a third modified example of the embodiment.

A third modified example of the embodiment will be described. FIG. 14 is a skeleton diagram illustrating the vehicle 100 according to the third modified example. A hybrid vehicle driving apparatus 1-4 according to the modified example is different from the hybrid vehicle driving apparatuses 1-1, 1-2, and 1-3 of the above-described embodiment and the modified examples thereof in that a five-axis configuration is provided and the differential unit and the second rotating electric machine MG2 are disposed on a third shaft. Counter gears 16 and 46 for connection are disposed on the second shaft and a fourth shaft. Using the counter gears 16 and 46, it is possible to prevent the interference between the transmission unit and the differential unit and to appropriately set the speed change ratio and the rotation direction. The configuration of the transmission unit may be set to be the same as those of the transmission units of the hybrid vehicle driving apparatuses 1-1, 1-2, and 1-3 of the above-described embodiment and the modified examples thereof. The hybrid vehicle driving apparatus 1-4 can be applied to the FF or RR layout.

As illustrated in FIG. 14, the first rotating electric machine MG1 and the second planetary gear mechanism 40 are disposed so as to be coaxial with the second rotating electric machine MG2. The second rotating electric machine MG2, the drive pinion gear 28, the second planetary gear mechanism 40, the counter driven gear 45, the differential unit clutch CL0 and the differential unit brake BK0, and the first rotating electric machine MG1 are disposed so as to be coaxial with the second rotating electric machine MG2 in order from the position near the engine 1.

The second planetary gear mechanism 40 is of a single pinion type as in the second planetary gear mechanism 20 of the above-described embodiment, and includes the second sun gear 41, the second pinion gear 42, the second ring gear 43, and the second carrier 44. The counter driven gear 45 is connected to the second carrier 44. The counter driven gear 45 engages with the counter drive gear 15 via the counter gear 16. The counter gear 16 has a diameter smaller than those of the counter drive gear 15 and the counter driven gear 45. The counter drive gear 15 is connected to the first ring gear 13. In the hybrid vehicle driving apparatus 1-4 according to the modified example, the first ring gear 13 is the output component of the first planetary gear mechanism 10, and the second carrier 44 is the first rotation component of the second planetary gear mechanism 40 as in the hybrid vehicle driving apparatus 1-1 of the above-described embodiment.

The differential unit clutch CL0 can connect the second sun gear 41 and the second carrier 44 to each other, as in the above-described embodiment. The differential unit brake BK0 can regulate the rotation of the second carrier 44, as in the first modified example of the above-described embodiment. The hybrid vehicle driving apparatus 1-4 may not include the differential unit brake BK0. Further, the one-way clutch F0 which regulates the negative rotation of the second carrier 44 may be provided instead of the differential unit brake BK0.

The first rotating electric machine MG1 is connected to the second sun gear 41. The rotation shaft 34 of the second rotating electric machine MG2 is connected to the second ring gear 43. That is, in the second planetary gear mechanism 40, the second sun gear 41 corresponds to the second rotation component, and the second ring gear 43 corresponds to the third rotation component. The drive pinion gear 28 is disposed in the rotation shaft 34 of the second rotating electric machine MG2. The drive pinion gear 28 is connected to the differential ring gear 29 via a counter gear 46. The counter gear 46 has a diameter smaller than that of the drive pinion gear 28 and the differential ring gear 29.

The hybrid vehicle driving apparatus 1-4 can be controlled based on the operation engagement table of the above-described embodiment. Further, in the case where the differential unit brake BK0 or the one-way clutch F0 is provided, the same control as the first modified example of the above-described embodiment can be performed.

In the hybrid vehicle driving apparatus 1-4 according to the third modified example, there is an advantage that the first shaft being coaxial with the engine 1 can be shortened in the FF layout. Further, the differential unit is intensively disposed on the third shaft.

Fourth Modified Example of Embodiment

Figure 15:
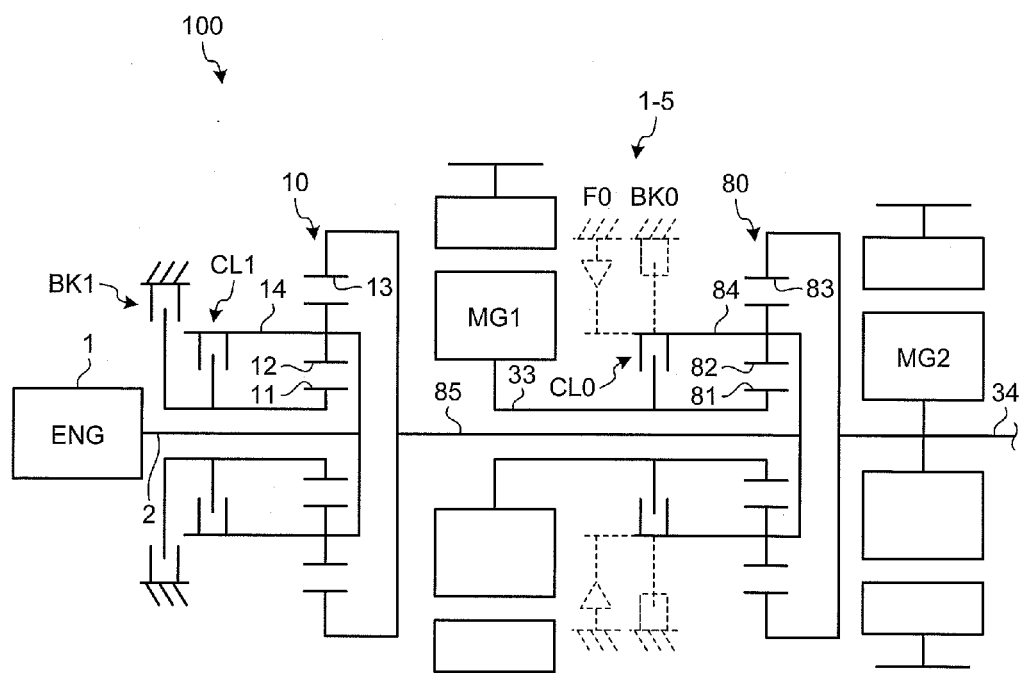
FIG. 15 is a skeleton diagram illustrating a vehicle according to a fourth modified example of the embodiment.

A fourth modified example of the embodiment will be described. FIG. 15 is a skeleton diagram illustrating the vehicle 100 according to the fourth modified example. A hybrid vehicle driving apparatus 1-5 according to the modified example is different from the hybrid vehicle driving apparatuses 1-1, 1-2, 1-3, and 1-4 of the above-described embodiment and the modified examples thereof in that a single-axis configuration is adopted. The hybrid vehicle driving apparatus 1-5 can be applied to a FR (front-engine/rear-wheel-drive) vehicle.

The transmission unit brake BK1, the transmission unit clutch CL1, the first planetary gear mechanism 10, the first rotating electric machine MG1, the differential unit clutch CL0, a second planetary gear mechanism 80, and the second rotating electric machine MG2 are disposed so as to be coaxial with the engine 1 in order from the position near the engine 1.

The configuration of the transmission unit may be set to be the same as those of the transmission units of the hybrid vehicle driving apparatuses 1-1, 1-2, 1-3, and 1-4 according to the above-described embodiment and the modified examples thereof. The rotation shaft 33 of the first rotating electric machine MG1 is hollow, and a connection shaft 85 is inserted thereinto. The connection shaft 85 connects the first ring gear 13 and a second carrier 84 to each other. The second planetary gear mechanism 80 is of a single pinion type as in the second planetary gear mechanism 20 of the above-described embodiment, and includes a second sun gear 81, a second pinion gear 82, a second ring gear 83, and the second carrier 84. The first ring gear 13 corresponds to the output component of the first planetary gear mechanism 10. Further, the second carrier 84, the second sun gear 81, and the second ring gear 83 correspond to the first rotation component, the second rotation component, and the third rotation component, respectively, of the second planetary gear mechanism 80.

The second ring gear 83 is connected to the rotation shaft 34 of the second rotating electric machine MG2. The rotation shaft 34 is a propeller shaft. The opposite side to the second ring gear 83 in the rotation shaft 34 is connected to the drive wheel via the differential device and the drive shaft (not illustrated).

Fifth Modified Example of Embodiment

In the above-described embodiment and the modified examples thereof, all of the first planetary gear mechanism 10 and the second planetary gear mechanisms 20, 40, and 80 are of a single pinion type, but the present invention is not limited thereto. For example, at least one of the first planetary gear mechanism 10 and the second planetary gear mechanisms 20, 40, and 80 may be formed in a double pinion type. For example, the first planetary gear mechanism 10 may be formed as a double-pinion-type planetary gear mechanism. In this case, the position of the first ring gear 13 and the position of the first carrier 14 are switched in each collinear diagram. In the single pinion type and the double pinion type, the over drive and the under drive of the transmission unit are reversed.

In the case where the first planetary gear mechanism 10 is formed in a double pinion type, the connection to the engine 1 and the second carrier 44 may be appropriately changed so as to become the over drive state.

A part of the hybrid vehicle driving apparatuses 1-1, 1-2, 1-3, 1-4, and 1-5 of the above-described embodiment and the modified examples may be used as a gear train for EV (Electric Vehicle). The configuration including the first rotating electric machine MG1, the second planetary gear mechanisms 20, 40, and 80, and the second rotating electric machine MG2 and obtained by excluding the engine 1 and the transmission unit from the hybrid vehicle driving apparatuses 1-1, 1-2, 1-3, 1-4, and 1-5 may be common to the EV gear train and the HV gear train.

According to the above-described embodiment and the modified examples thereof, there is disclosed a "driving apparatus including an engine, a transmission unit, and a differential unit; wherein an output shaft of the engine is connected to an input shaft of the transmission unit, wherein a first component of the differential unit is connected to an output shaft of the transmission unit, wherein a first rotary machine (electric motor) is connected to a second component, wherein a second rotary machine (electric motor) is connected to a third component, wherein a switching means is provided so as to drive both of the first rotary machine and the second rotary machine, and wherein the speed change operation of the differential unit is performed in the opposite direction to that of the transmission unit at the same time when the speed change ratio of the transmission unit is changed".

In the above-described driving apparatus, the first rotating electric machine MG1 (the first rotary machine) and the second rotating electric machine MG2 (the second rotary machine) can be used together in the EV travel mode, and the transmission efficiency can be improved by increasing the number of the mechanical points in the HV travel mode. Since the transmission unit is provided before the differential unit, it is possible to set the deceleration ratio, for example, the differential ratio from the differential unit to the output (the vehicle wheel), to a relatively large value. Accordingly, it is possible to make heavy use of a high rotation region that is advantageous for the motor in the EV travel mode. Further, since two mechanical points are obtained by the speed change operation in the HV travel mode, it is possible to reduce the circulation of power even at the high vehicle speed.

Note that the driving apparatus may be a "driving apparatus including an engine, a transmission unit, and a differential unit; wherein an output shaft of the engine is connected to an input shaft of the transmission unit, wherein an output shaft of the transmission unit is connected to the differential unit, and wherein the differential unit includes a first rotary machine and a second rotary machine and is operated as an electric CVT transmission unit".

The content disclosed in the above-described embodiment and the modified examples thereof may be employed after appropriately combining the content thereof.

REFERENCE SIGNS LIST 1-1, 1-2, 1-3, 1-4, 1-5 HYBRID VEHICLE DRIVING APPARATUS
1 ENGINE
10 FIRST PLANETARY GEAR MECHANISM
13 FIRST RING GEAR
20, 40, 80 SECOND PLANETARY GEAR MECHANISM
21, 41, 81 SECOND SUN GEAR
23, 43, 83 SECOND RING GEAR
24, 44, 84 SECOND CARRIER
32 DRIVE WHEEL
50 HV_ECU
60 MG_ECU
70 ENGINE_ECU
100 VEHICLE
CL0 DIFFERENTIAL UNIT CLUTCH
BK1 TRANSMISSION UNIT BRAKE
CL1 TRANSMISSION UNIT CLUTCH
MG1 FIRST ROTATING ELECTRIC MACHINE
MG2 SECOND ROTATING ELECTRIC MACHINE

The invention claimed is:

1. A hybrid vehicle driving apparatus comprising:
a first differential mechanism which is connected to an engine and is able to output a rotation of the engine while changing its rotation speed;
a second differential mechanism configured to connect the first differential mechanism and a drive wheel to each other
a regulation device configured to switch between a state where a differential operation of the second differential mechanism is regulated and a state where the differential operation of the second differential mechanism is allowed; and
a switching device configured to switch the first differential mechanism to a connection state where the engine and the second differential mechanism are connected to each other and a neutral state where the engine and the second differential mechanism are disconnected from each other, wherein
the second differential mechanism includes a first rotation component which is connected to an output component of the first differential mechanism, a second rotation component which is connected to a first rotating electric machine, and a third rotation component which is connected to a second rotating electric machine and the drive wheel,
the switching device includes a clutch which is able to connect the rotation components of the first differential mechanism to one another and a brake which regulates the rotation of the rotation component of the first differential mechanism, and
a predetermined mode is provided in which the differential operation of the second differential mechanism is regulated by the regulation device and the vehicle travels using the first rotating electric machine and the second rotating electric machine as power sources in the neutral state of the first differential mechanism.

2. The hybrid vehicle driving apparatus according to claim 1, Wherein
at the time the engine is started up while the vehicle travels in the predetermined mode, the first differential mechanism is switched to the connection state so as to rotate the engine.

3. The hybrid vehicle driving apparatus according to claim 1, wherein
the speeds of the first differential mechanism and the second differential mechanism are simultaneously changed.

4. The hybrid vehicle driving apparatus according to claim 3, Wherein
at the time the speeds of the first differential mechanism and the second differential mechanism are simultaneously changed, one of speed change ratios of the first differential mechanism and the second differential mechanism is increased and the other speed change ratio thereof is decreased.

5. The hybrid vehicle driving apparatus according to claim 1, further comprising:
a second regulation device which is able to regulate a rotation of the first rotation component.

* * * * *